United States Patent
Ito et al.

(10) Patent No.: US 7,274,558 B2
(45) Date of Patent: Sep. 25, 2007

(54) ELECTRONIC APPARATUS AND DISPLAY PANEL FIXED STRUCTURE

(75) Inventors: Katsunori Ito, Kawasaki (JP); Masahiko Sato, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 352 days.

(21) Appl. No.: 11/097,714

(22) Filed: Mar. 31, 2005

(65) Prior Publication Data
US 2006/0044743 A1    Mar. 2, 2006

(30) Foreign Application Priority Data
Aug. 27, 2004    (JP)    ............... 2004-249256

(51) Int. Cl.
*G06F 1/16*    (2006.01)
*H05K 5/00*    (2006.01)
(52) U.S. Cl. .................. 361/681; 349/58; 248/917
(58) Field of Classification Search ........ 361/679–682; 349/58; 248/917–923; 348/794
See application file for complete search history.

(56) References Cited

U.S. PATENT DOCUMENTS

| | | | |
|---|---|---|---|
| 5,719,752 A * | 2/1998 | Mori et al. .................. 361/807 |
| 6,091,601 A * | 7/2000 | Schlesener et al. ......... 361/681 |
| 6,125,040 A | 9/2000 | Nobuchi et al. |
| 6,392,723 B1 * | 5/2002 | Sugiyama et al. ............ 349/58 |
| 6,430,039 B2 * | 8/2002 | Nakajima et al. ........... 361/681 |
| 6,564,429 B2 * | 5/2003 | Bovio et al. .................. 16/382 |
| 6,671,012 B1 * | 12/2003 | Tanaka ......................... 349/58 |
| 6,774,959 B2 * | 8/2004 | Agata et al. .................. 349/58 |
| 2002/0159227 A1 | 10/2002 | Sasaki et al. |
| 2005/0174726 A1 * | 8/2005 | Bang et al. ................. 361/681 |
| 2006/0171106 A1 * | 8/2006 | Cho et al. ................... 361/681 |

FOREIGN PATENT DOCUMENTS

| JP | 11-312876 | 11/1999 |
|---|---|---|
| JP | 2000-047754 | 2/2000 |
| JP | 2002-328622 | 11/2002 |

* cited by examiner

*Primary Examiner*—Jayprakash Gandhi
*Assistant Examiner*—Anthony Q Edwards
(74) *Attorney, Agent, or Firm*—Sheppard, Mullin, Richter & Hampton LLP

(57) ABSTRACT

An electronic apparatus of the present invention has a display panel incorporating therein a display screen and a back cover that covers the display panel. The display panel is fixed to the back cover via a fixing part. The back cover has a positioning pin standing on the same central axis as a mounting hole formed in the display panel. The fixing part has a positioning hole that engages the positioning pin and a screw hole on the same central axis as the positioning hole. A screw is screwed into the screw hole of the fixing part through the mounting hole of the display panel.

8 Claims, 37 Drawing Sheets

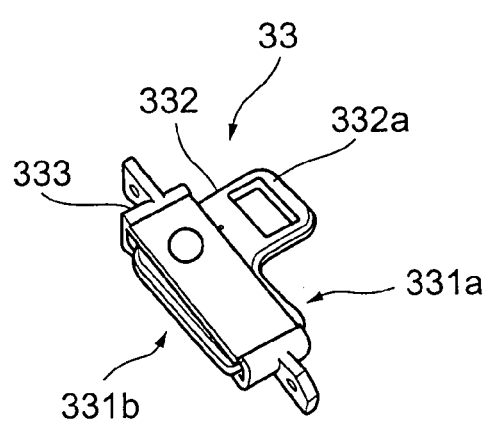 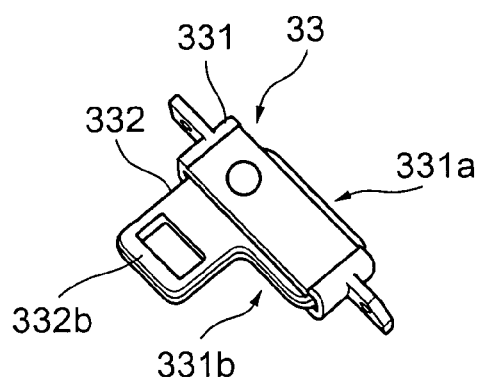
Fig. 9 A　　　　　Fig. 9 B

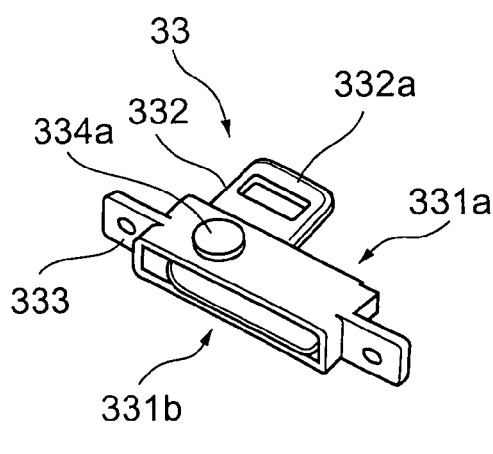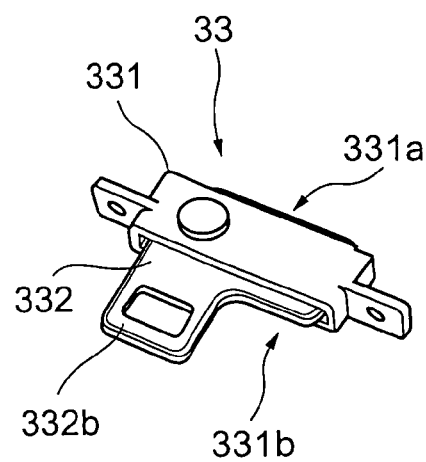
Fig. 12 A  Fig. 12 B

ELECTRONIC APPARATUS AND DISPLAY PANEL FIXED STRUCTURE

CROSS-REFERENCE TO RELATED APPLICATION

This application claims priority to Japanese Patent Application No. 2004-249256 filed on Aug. 27, 2004, the entire disclosure of which is incorporated by reference.

FIELD OF THE INVENTION

The present invention relates to an electronic apparatus provided with a display panel having a screen display therein and to a fixed structure of the display panel.

BACKGROUND OF THE INVENTION

Typically, electronic apparatus such as notebook or laptop computers have a first unit having a keyboard that is coupled by hinges to a second unit having a display screen, such that the two units can be opened and closed relative to each other. When the apparatus is used, the second unit is opened, and when it is not used, the second unit is closed such that the display screen lies on the keyboard. This type of apparatus is well known as a notebook personal computer (hereinafter referred to as a notebook PC).

Another type of portable computer includes a display screen, wherein the display screen is configured to recognize a stylus or pen-like device that is placed close to or in contact with the screen to enable user input. This type of apparatus is well known as a tablet personal computer (hereinafter referred to as a tablet PC).

Recently, convertible tablet/notebook computers have become available with the first unit and the second unit coupled through a two-axis coupling device which allows rotation of the second unit in two directions relative to the first unit. This configuration allows the computer to be used either as a notebook PC with the display screen projecting upward from the keyboard, or as a tablet PC with the display screen resting facing up on the keyboard (refer to Japanese Patent Application Publication No. 11-312876).

Such electronic apparatus are usually provided with a display panel having a large display screen. The display panel is generally fixed to the apparatus in the following manner. A mounting hole is formed in the display panel whereas a boss having a screw hole in the center is formed on the back cover. The display panel is then fixed by inserting a screw through the mounting hole into the screw hole formed on the boss.

A fixing member or supporting member of elastic material which is used for fixing a display panel is disclosed in Japanese Patent Application Publications No. 2000-47754 and No. 2002-328622. The elastic material is used to protect the display panel from being damaged by a strong force.

Display panels made by different manufactures have the respective mounting holes in different positions. If only one type of back cover is used and needs to accept two or more types of display panels made by different manufactures, the back cover must have two or more bosses with a screw hole for the mounting holes of these different types of display panels. The bosses are formed in the different positions of the back cover.

However, if the back cover has this structure, a boss formed for one type of display panel interferes with other type of display panel made by other manufacturer. Due to such interference, this other type of display panel cannot be fixed to the back cover.

Even if only a particular display panel made by a particular manufacturer is adopted and a boss is formed on the back cover so as to correspond to a mounting hole of the display panel, the boss interferes with components to be positioned and fixed other than the display panel.

These situations can be avoided by forming a boss on the back cover in the position that does not correspond to the position of a mounting hole of the display panel, and by using a fixing part to connect the boss and the mounting hole that are positioned apart.

However, as pointed out by Japanese Patent Application Publications No. 2000-47754 and No. 2002-328622, if the fixing part is used for fixing, there arises a problem that blurred images are displayed due to a dimensional deviation, which needs to be addressed.

SUMMARY OF THE INVENTION

The present invention has been made in view of the above circumstances and provides an electronic apparatus having a structure in which a display panel is fixed by suppressing a dimensional deviation to a sufficiently low level even if the position of a boss formed on the back cover and the position of a mounting hole formed in the display panel do not coincide. The present invention also provides a display panel fixed structure used in the electronic apparatus.

An electronic apparatus of the present invention includes a display panel having a display screen and a cover for covering the display panel, wherein:

the display panel has a first mounting hole for accepting a fastener;

the cover has a first boss on which a first fastener hole is formed and which is formed in a position off the first mounting hole, and the cover further has a positioning projection that projects on the same central axis as the first mounting hole; and the electronic apparatus includes a fixing member in which are formed a second mounting hole that is fixed by a fastener to the first fastener hole of the first boss, a positioning hole in which the positioning projection is engaged, and a second fastener hole that is formed on the same central axis as the positioning hole and fixed by a fastener to the first mounting hole.

According to the present invention, the cover of the electronic apparatus has a positioning projection that projects on the same central axis as the first mounting hole of the display panel. On the other hand, the fixing member of the electronic apparatus has a positioning hole in which the positioning projection is engaged, and the fixing member further has a fastener hole that is formed on the same central axis as the positioning hole and fixed by a fastener to the first mounting hole (of the display panel). Thus, even if a boss of the back cover for fixing the display panel is formed in a position that does not match the position of a mounting hole of the display panel, it is possible to fix the display panel with sufficiently high position precision, according to the present invention.

Further, in the electronic apparatus of the present invention, the cover may be capable of accepting a display panel having a third mounting hole that is formed in a position different from the first mounting hole instead of the first mounting hole, and the cover may include a second boss that has a third fastener hole on the same central axis as the third mounting hole.

In this manner, the electronic apparatus of the present invention may be configured such that the cover can accept two or more types of display panels having the respective mounting holes formed in different positions and the cover has the second boss to which a display panel of other type is directly screwed.

Furthermore, in the electronic apparatus of the present invention, the fixing member may have a bent portion having two plates bent to face each other, and the positioning hole may be formed in the lower plate of the bent portion and the second fastener hole may be formed in the upper plate of the bent portion. Still furthermore, in the electronic apparatus of the present invention, the fixing member may have a through hole of which lower portion is used as the positioning hole and of which upper portion is used as the second fastener hole.

The display panel can be fixed to the cover with high position precision by using the above fixing members.

A display panel fixed structure according to the present invention is used in an electronic apparatus provided with a display panel, the display panel including a display screen and a cover for covering the display panel, wherein:

the cover has a first boss on which a first fastener hole is formed and which is formed in a position off a first mounting hole formed in the display panel for accepting a fastener, and the cover further has a positioning projection that projects on the same central axis as the first mounting hole; and the display panel fixed structure includes a fixing member in which are formed a second mounting hole that is fixed by a fastener to the first fastener hole of the first boss, a positioning hole in which the positioning projection is engaged, and a second fastener hole that is formed on the same central axis as the positioning hole and fixed by a fastener to the first mounting hole.

Further, in the display panel fixed structure of the present invention, the cover may be capable of accepting a display panel having a third mounting hole that is formed in a position different from the first mounting hole instead of the first mounting hole, and the cover may include a second boss that has a third fastener hole on the same central axis as the third mounting hole.

Furthermore, in the display panel fixed structure of the present invention, the fixing member may have a bent portion having two plates bent to face each other, and the positioning hole may be formed in the lower plate of the bent portion and the second fastener hole may be formed in the upper plate of the bent portion. Still furthermore, in the display panel fixed structure of the present invention, the fixing member may have a through hole of which lower portion is used as the positioning hole and of which upper portion is used as the second fastener hole.

As described above, the present invention makes it possible to fix the display panel to the back cover by suppressing a dimensional deviation to a sufficiently low level even if the position of the boss formed on the back cover and the position of the mounting hole formed in the display panel do not coincide with each other.

BRIEF DESCRIPTION OF THE DRAWINGS

FIGS. 9A and 9B are perspective views of an attachment unit provided in the second unit;

FIGS. 12A and 12B are perspective illustrations of another embodiment of an attachment unit;

DETAILED DESCRIPTION

An embodiment of an electronic apparatus according to the present invention is explained below.

[Appearance]

Figure 1:
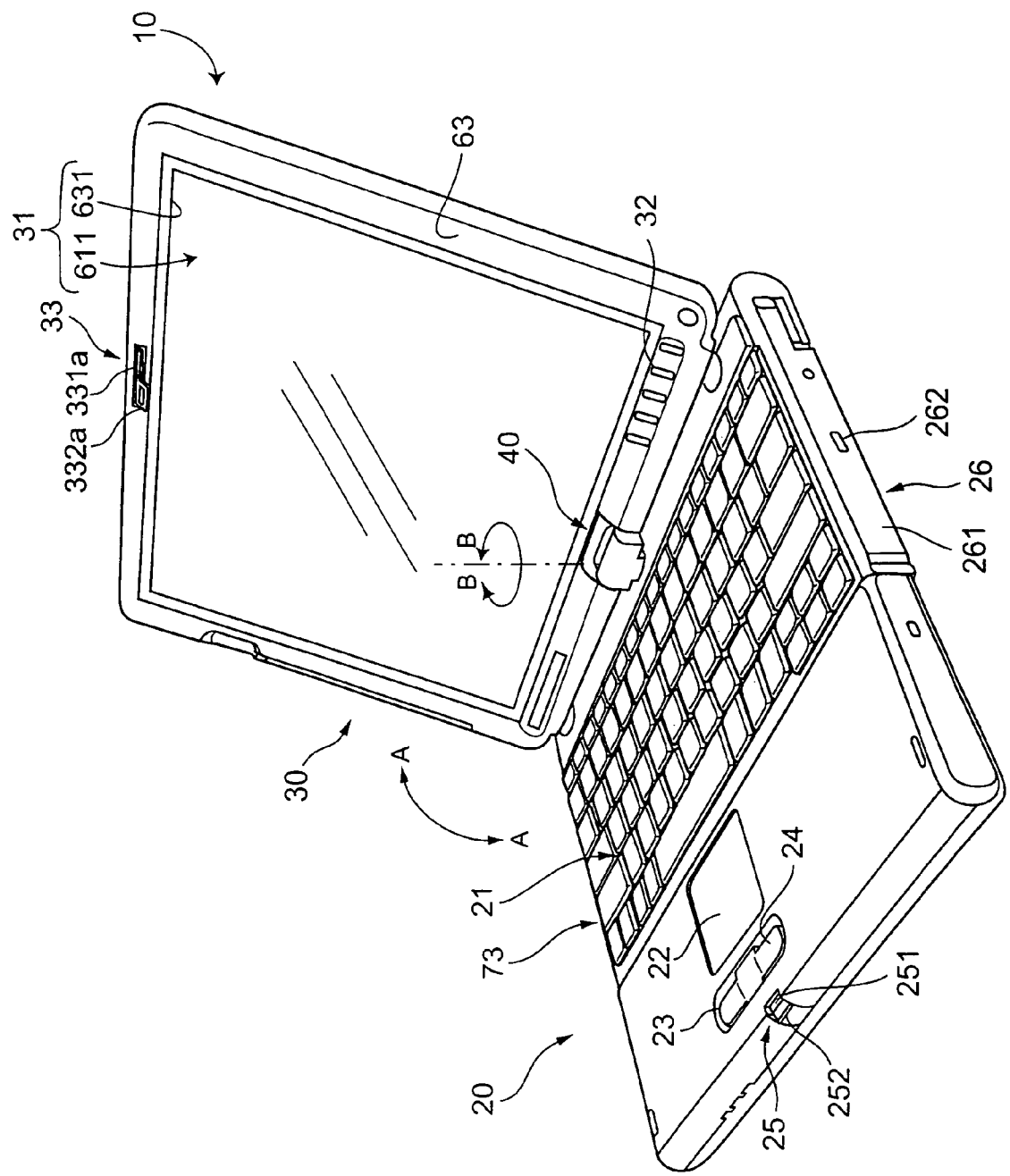
FIG. 1 is a perspective illustration of an electronic apparatus according to an embodiment of the present invention.

FIG. 1 is a perspective illustration of the appearance of the electronic apparatus of the present invention.

An electronic apparatus 10 includes a first unit 20, and a second unit 30. These first unit 20 and second unit 30 are coupled through a two-axis coupling section 40 such that the second unit 30 can be opened and closed in the direction of the arrow A-A to the first unit 20, and can be rotated in the direction of the arrow B-B (on the vertical rotation axis). In FIG. 1, the second unit 30 is open relative to the first unit 20 (open status).

The first unit 20 includes on an upper cover 73 a keyboard 21, a track pad 22, a left click button 23, a right click button 24, and an engagement unit 25 for engaging the second unit 30 when the second unit 30 is closed. The engagement unit 25 is provided with an engagement hole 251 for the fixture of the second unit 30, and an engagement release button 252 for releasing the engagement of the fixture in the engagement hole. The details of the engagement unit 25 are described later. On a side of the first unit 20, an open/close cover 261 of an optical disk drive 26 for accessing an optical disk such as a CD, a DVD, etc. The open/close cover 261 is provided removed from the optical disk drive 26.

Figure 2:
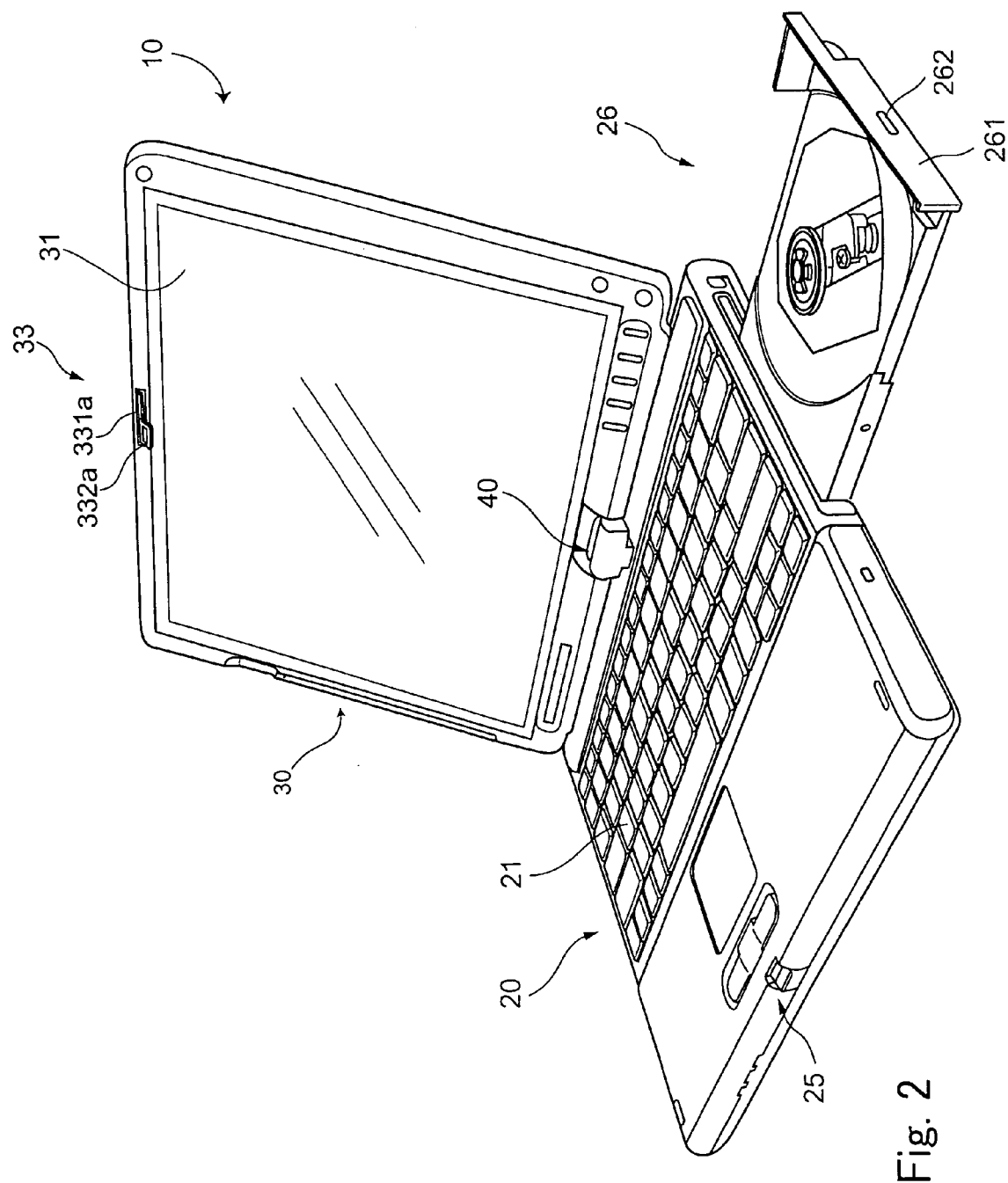
FIG. 2 is a perspective illustration of the electronic apparatus shown in FIG. 1 in which the optical disk drive is in the open status.

FIG. 2 is a perspective illustration of the electronic apparatus of FIG. 1 showing the optical disk drive 26 in the open position.

When the eject button 262 provided on the open/close cover 261 of the optical disk drive 26 is pressed, the tray of the optical disk drive 26 can be projected as shown in FIG. 2, so that the optical disk can be inserted or removed.

Referring back to FIG. 1, the second unit 30 of the electronic apparatus 10 shown in FIG. 1 includes a front cover 63 having a display window 631. This side of the second unit 30 will be referred to as the "front" side. In the display window 631, a display screen 611 of a built-in display panel 61 (refer, e.g., to FIGS. 19 to 21) is shown. The combination of the display screen 611 and the display window 631 is sometimes referred to as display screen 31. The second unit 30 is provided with buttons 32 adjacent to the display screen 31. Above the display screen 31 is an attachment unit 33 provided with a fixture for engaging the engagement unit 25 of the first unit 20 when the second unit 30 is closed. As described in detail later, the attachment unit 33 includes two fixtures. In FIG. 1, one fixture 332a of the two fixtures is projected from an aperture 331a on the front of the second unit 30.

Figure 3:
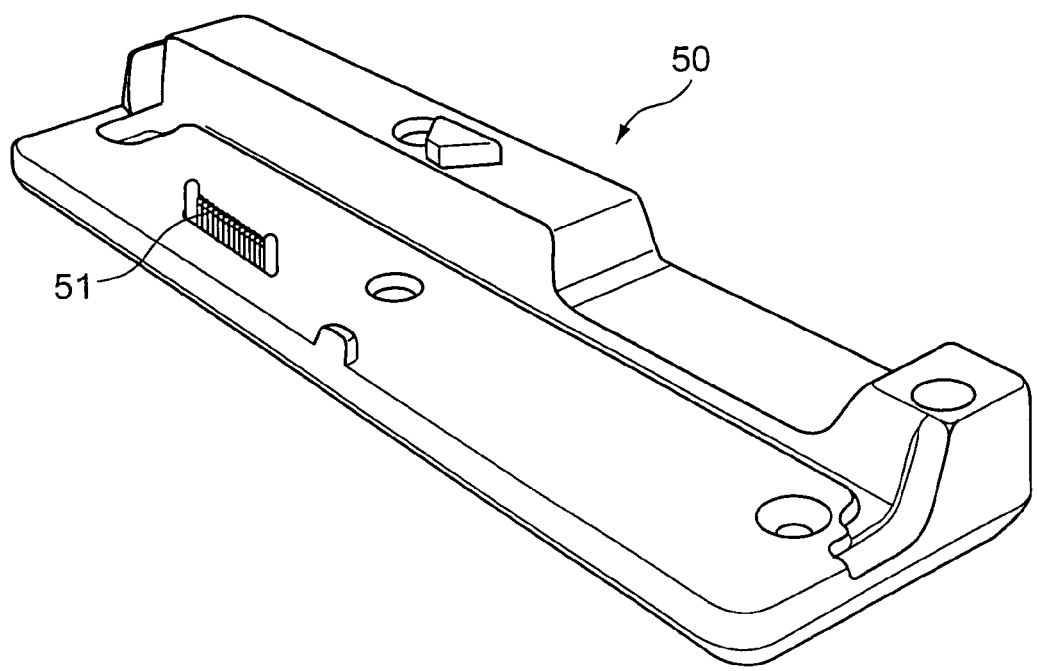
FIG. 3 is a perspective illustration of a port replicator attached to the electronic apparatus shown in FIGS. 1 and 2.
Figure 4:
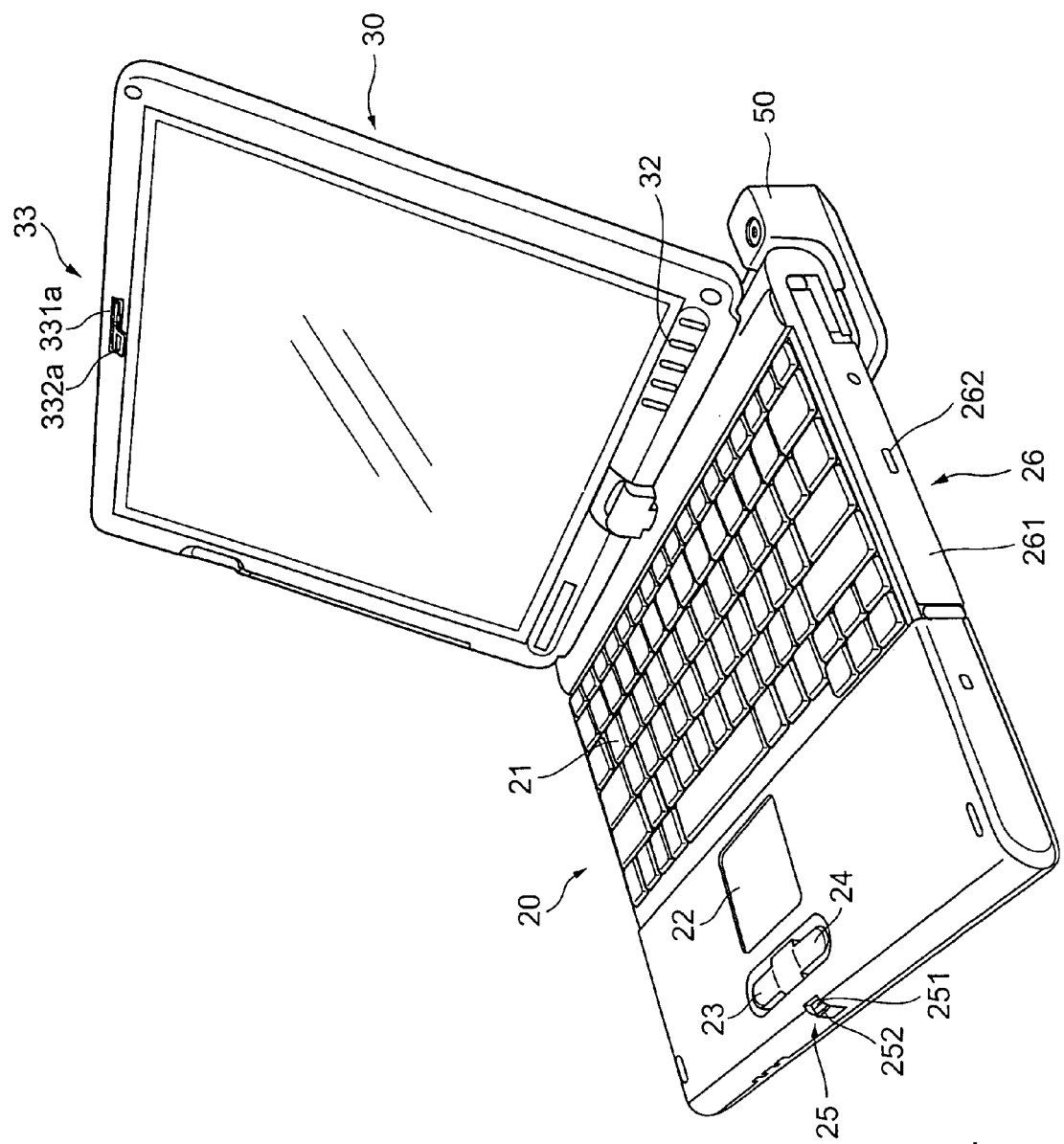
FIG. 4 is a perspective illustration of the electronic apparatus of the present invention in the open status, coupled to the port replicator shown in FIG. 3.

FIG. 3 is a perspective view of a port replicator 50 for use with the electronic apparatus 10 shown in FIG. 2. FIG. 4 shows the first unit 20 of the electronic apparatus 10 coupled to the port replicator 50 with the second unit 30 in the open position.

As shown in FIG. 3, the port replicator 50 is provided with a connector 51 for electrically coupling to the first unit 20, and has a variety of I/O terminals on the back (not shown). The connector 51 of the port replicator 50 is coupled to a mating connector (not shown) provided at the bottom of the first unit 20, thereby providing a signal between the first unit 20 and the port replicator 50. Although various I/O terminals are provided in the first unit 20, the port replicator 50 has the function of extending the number of the I/O terminals. Various peripheral devices may be connected to the I/O terminals of the port replicator 50, thereby adding the functionality of the electronic apparatus 10. Thus, the first unit is simply placed on the port replicator 50 as shown in FIG. 4 to provide the desired added functionality. However, when it is not necessary to use the peripheral devices provided by the port replicator 50, the electronic apparatus 10 may be removed from the port replicator 50 and can be used as either in the notebook PC mode or the tablet PC mode.

Figure 5:
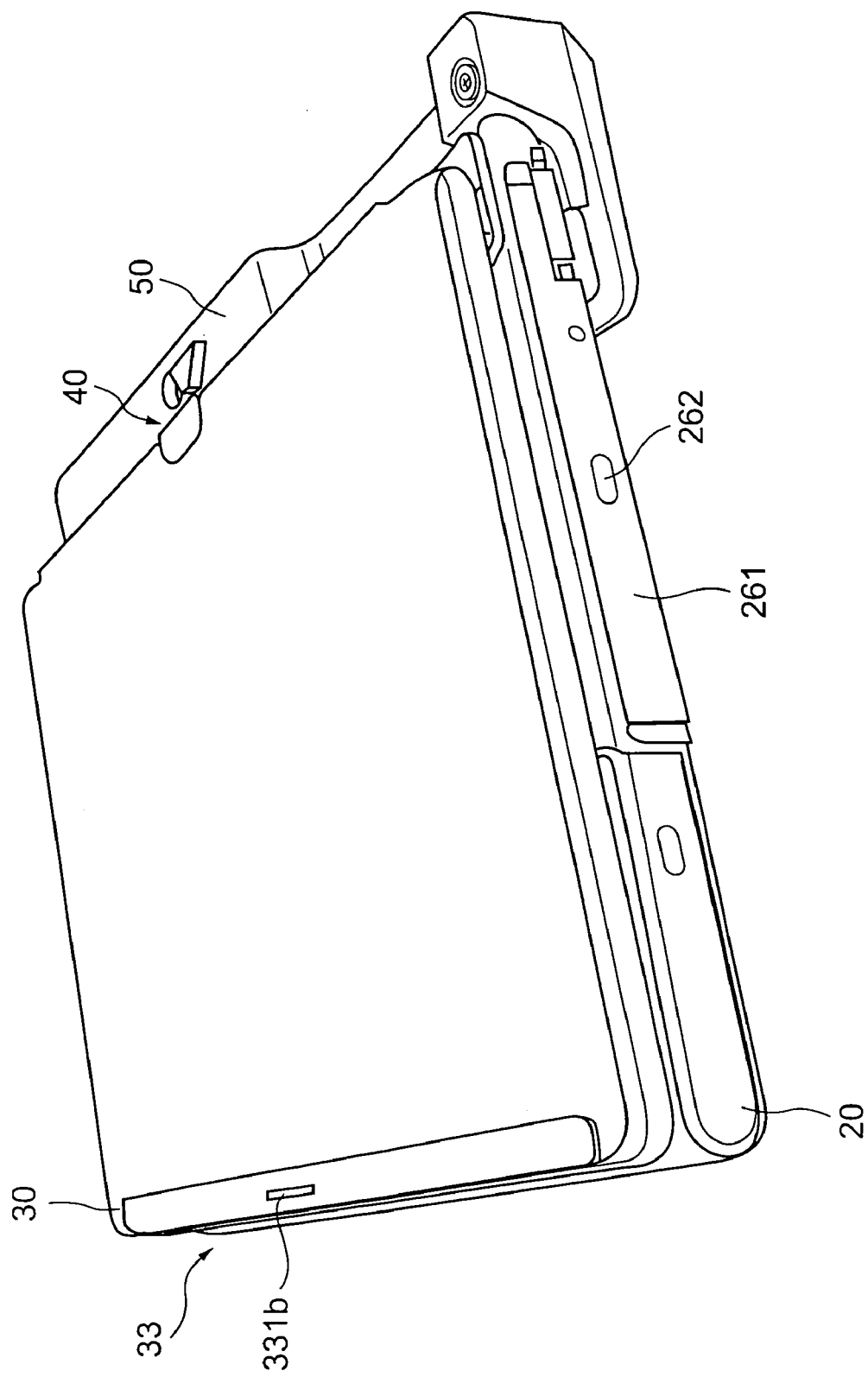
FIG. 5 is a perspective illustration showing the electronic apparatus of the present invention in the closed status, coupled to the port replicator.

FIG. 5 shows the electronic apparatus 10 placed on the port replicator with the second unit 30 in the closed position.

The second unit 30 is laid on the first unit 20 with the display screen 31 (refer to FIG. 1) facing the first unit 20, which is referred to as the first closed status.

As shown in FIG. 5, the attachment unit 33 for engagement in the first unit 20 in the closed status has an aperture 331b on the back of the second unit 30. The details of the attachment unit 33 are described later.

Figure 6:
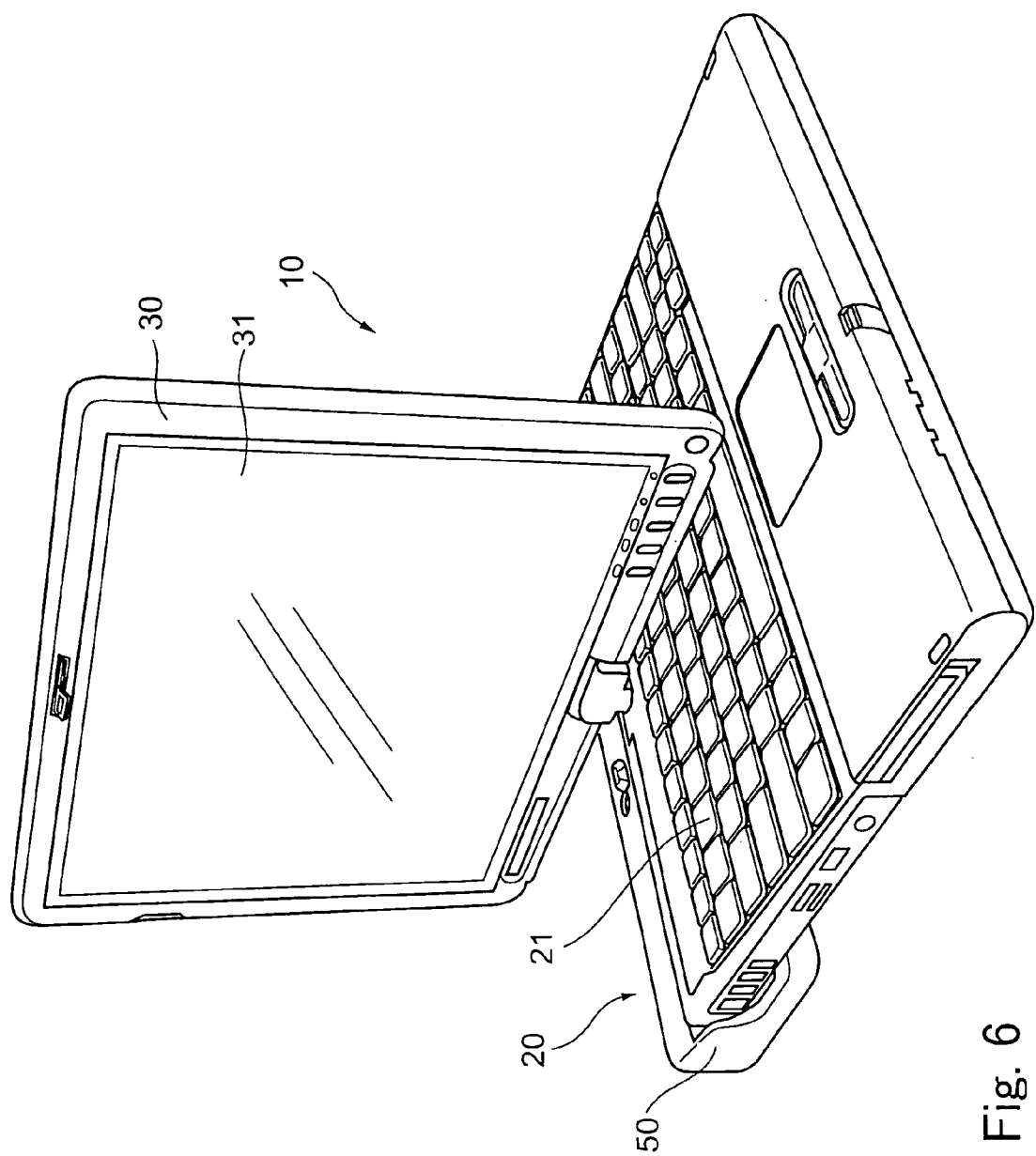
FIG. 6 is a perspective illustration showing the second unit rotated by 90° relative to the normal open position.

FIG. 6 shows the electronic apparatus 10 with the second unit 30 that is rotated by 90° relative to the front side of the first unit 20. The second unit 30 can be further rotated such that the display screen 31 faces away from the keyboard 21.

Figure 7:
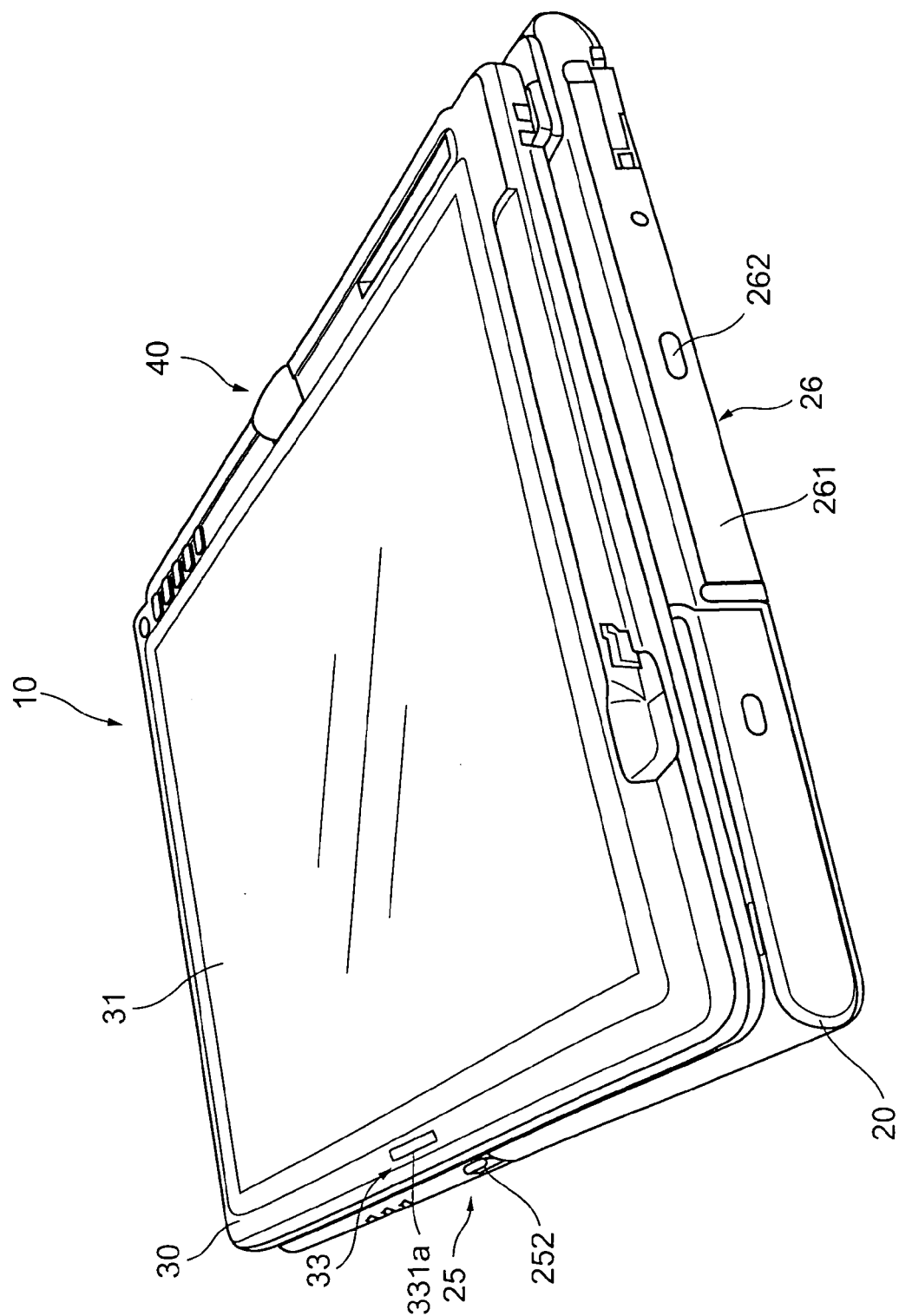
FIG. 7 is a perspective illustration showing the second unit lying on the first unit with the display screen facing upward.

The second unit 30 can then be rotated down into a position such that the display screen 31 faces upward when the two units are closed, as shown in FIG. 7. In this position, the display is opposite the keyboard 21 and is visible to the user. This position is referred to as the second closed status. In the second closed status, the electronic apparatus 10 may be used as a tablet PC, and this is sometimes referred to herein as the tablet mode. Normally, in the tablet mode, the electronic apparatus 10 is not coupled to the port replicator 50 (refer to FIG. 3).

The display screen 31 has a pen input function for detecting the contact of a pen or the close position of a pen. Normally, when the electronic apparatus 10 is in the tablet mode it is carried in the user's arm, and the hand of the other arm holds a pen (not shown), which is used to provide input directly to the display screen. Normally, in the tablet mode the image on the display screen 31 is rotated by 90° relative to the display provided in the notebook PC mode shown in FIG. 1.

When the electronic apparatus 10 is in the tablet mode as shown in FIG. 7, the aperture 331a of the attachment unit 33 on the second unit 30 faces upward. The aperture 331a is positioned adjacent to the display screen 31, and the aperture 331a is also shown in FIG. 1. As shown in FIG. 1, when the electronic apparatus 10 is in the notebook mode, the first fixture 332a projects from the aperture 331a. In contrast, when the electronic apparatus 10 is in the tablet mode, no fixture projects from the aperture 331a as shown in FIG. 7, instead, another fixture projects from the aperture 331b (refer to FIG. 5) on the back of the second unit 30, and the fixture is engaged in the engagement hole 251 shown in FIG. 1. In the engaged status the second unit 30 is securely held by the first unit 20 until the engagement release button 252 is operated. When the second unit 30 is engaged in the manner shown in FIG. 7, the electronic apparatus 10 can be used as a tablet PC having a planar housing.

[Engagement Unit and Attachment Unit]

Figure 8:
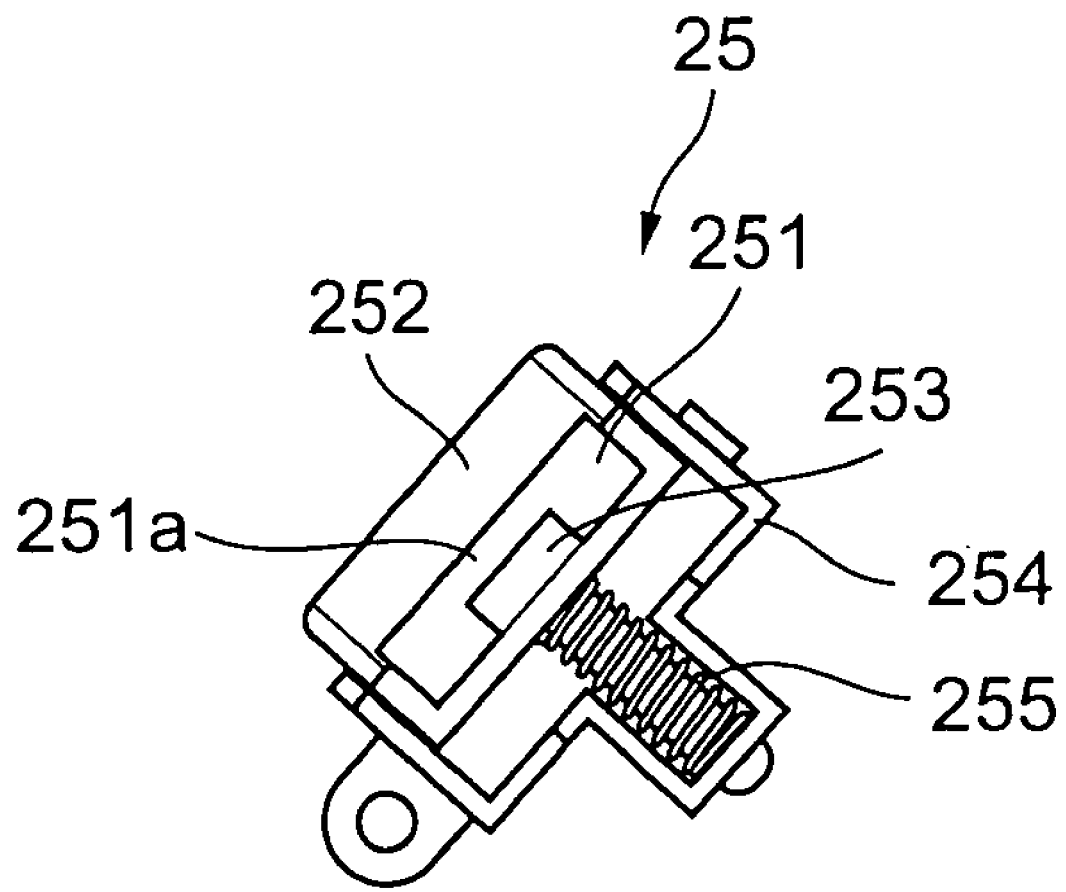
FIG. 8 is a plan view showing an engagement unit provided in the first unit.

FIG. 8 shows an embodiment of the engagement unit 25 provided in the first unit (refer to FIG. 1).

The engagement hole 251 is formed in the engagement unit 25. At the center of the engagement hole 251, an engagement detent 253 is extended from a side into the engagement hole 251. Adjacent to the engagement hole 251, the engagement release button 252 is formed on the side opposite to the detent. The engagement release button 252 and the engagement detent 253 are integrally formed as one piece (hereinafter referred to as an engagement part). At the center of the part, the engagement hole 251 is formed. The engagement part is slidably held in a frame part 254, and the engagement part is urged by a spring 255 towards the direction of the release button 252.

The top surface of the engagement detent 253 is tapered. When a fixture such as fixture 332a or fixture 332b (shown, for example in FIGS. 9A and 9B) of the attachment unit 33 enters the engagement hole 251, the fixture exerts force on the tapered portion of the engagement detent 253, causing the spring 255 to compress such that the engagement part slides out of the way of the fixture. As shown in FIGS. 9A and 9B, the fixtures have an aperture or hole formed therein which is sufficiently large to accept the engagement detent 253. As the fixture travels into the engagement hole 251, the hole in the fixture becomes aligned with engagement detent. This allows the spring 251 to release causing the detent 253 to enter the hole in the fixture and securely engage the engagement detent 253. The fixture is thereby locked in position by the engagement unit 25. When the engagement release button 252 is pressed, the engagement part compresses the spring 255 and moves the detent 253 out of the hole in the fixture. The fixture may then be removed from the engagement hole 251.

FIGS. 9A and 9B show the attachment unit 33 provided in the second unit 30, including a fixture. FIGS. 10A and 10B show a fixture member of the attachment unit 33 shown in FIGS. 9A and 9B. FIGS. 11A and 11b show a cover member of the attachment unit 33.

The attachment unit 33 is composed of a fixture member 332 and a cover member 333. First, the fixture member 332 is explained below.

FIGS. 10A and 10B respectively show the two sides of the fixture member 332 which are substantially identical.

The fixture member 332 is provided with the first fixture 332a and the second fixture 332b which are 90° apart. Between the fixtures is a projection 332c which serves as a rotation axis. Two substantially identical concave sections 332d and 332e are formed at an equal distance from the projection 332c. The concave sections 332d and 332e are connected by an arcuate groove 332f which is shallower than the two concave sections 332d and 332e.

Now the cover member 333 is explained below.

FIG. 11a shows a cutaway view of the cover member. FIG. 11B shows the inner side of the cover member of the cut off portion.

The cover member 333 has two spaced apart, parallel plate sections 333a and 333b. Each of the plate sections 333a and 333b contains a support hole 333c to engage the projection 332c of the fixture member 332 such that the fixture member 332 can be rotated within the cover. A convex section 333d is formed on interior of the two plate sections 333a and 333b. When the fixture member 332 is position in the cover member 333, the convex section 333d engages either the first concave section 332d or the second concave section 332e, or during the rotation of the fixture member 332, the convex section 333d is located within the arcuate groove 332f. On both ends of the cover member 333, a tip section 333g having an attachment hole is provided.

The fixture member 332 is positioned within the cover member 333, by inserting it between the two plate sections 333a and 333b of the cover member 333. The two plate sections 333a and 333b expand allowing the fixture member 332 to enter the space between the two plate sections 333a and 333b, and the projection 332c enters the support hole 333c. Simultaneously, the convex section 333d provided inside the two plate sections 333a and 333b is engaged in the first concave section 332d or the second concave section 332e of the fixture member 332. The fixture member 332 can be rotated by 90°. During rotation, the convex section 333d of the cover member 333 travels in the arcuate groove 332f. Since the arcuate groove 332f is shallower than the first concave section 332d or the second concave section 332e, the two plate sections 333a and 333b are deflected slightly outward during the rotation. The user can feel the fixture member "click" into position when the convex section 333d enters the first concave section 332d or the second concave section 332e. Since the concave sections are deeper than the arcuate groove 332f, the cover member 333 holds the fixture member 332 in position when the convex section 333d is engaged in either first concave section 332d, 332e. Thus, in order to rotate the fixture member 332 it is necessary to apply a slight force.

The two apertures 331a and 331b shown in FIGS. 9A, 9B, 12A and 12B are formed on the sides of the cover member 333 by the plate sections 333a and 333b.

By rotating the fixture member 332 as previously described, either the first fixture 332a or second fixture 332b will extend from the aperture 331a or 331b as shown. The other fixture that does not project outwardly is retained in the space between the two plate sections 333a and 33b.

Figure 10:
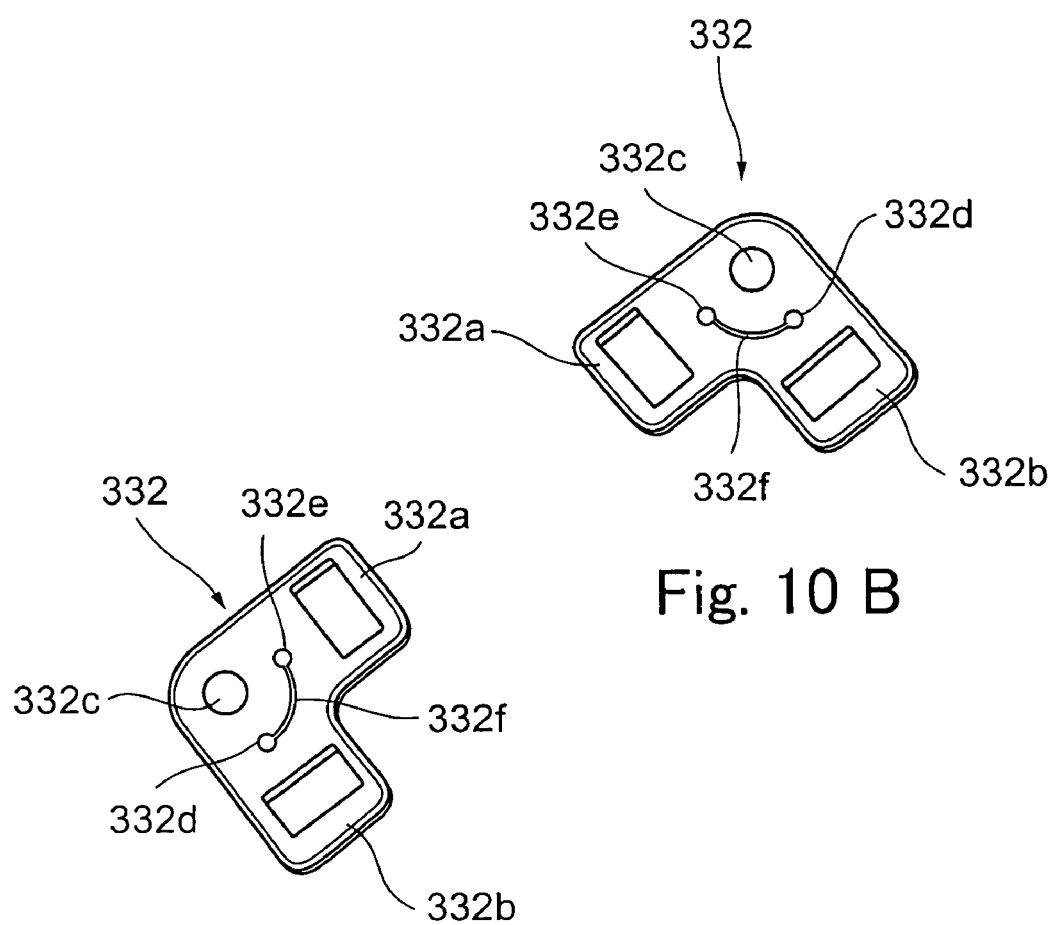
FIGS. 10A and 10B are perspective views of a fixture member of the attachment unit.
Figure 11:
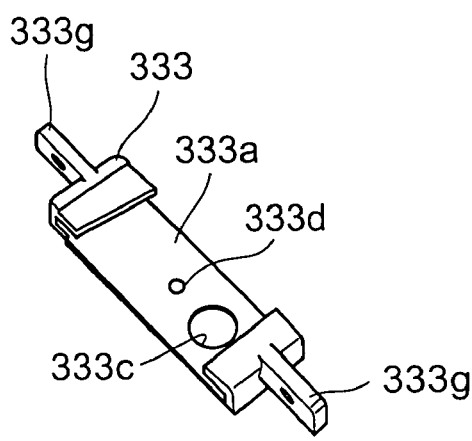
FIGS. 11A and 11B show a cutaway view of a cover member of the attachment unit.
Figure 11:
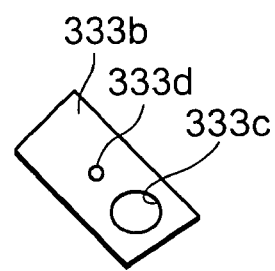

When the first fixture 332a is operated and rotated from the position of FIG. 9A, the convex sections 333d shown in FIG. 11 are removed from the first concave section 332d shown in FIG. 10 with the feeling of click, the convex section 333d travels on the arcuate groove 332f. After rotating 90° and the convex sections 333d engage in the second concave section 332e shown in FIGS. 10A and 10B and click into position. At this time, as depicted in FIG. 9B, the second fixture 332b projects from the aperture 331b and the first fixture 332a is stored between the two plate sections 333a and 33b.

In order to allow the electronic apparatus 10 in the open status shown in FIG. 4 to enter the first closed status shown in FIG. 5, the fixture member is rotated such that the first fixture 332a of the fixture member 332 of the attachment unit 33 projects from the aperture 331a of the display screen 31 (refer to FIG. 4), and the second unit 30 is rotated onto the top of the first unit 20 such that the display screen 31 faces the first unit 20. In this position, the first fixture 332a extends into the engagement hole 251 of the engagement unit 25 provided in the first unit 20, the first fixture 332a is engaged in the engagement unit 25 as explained above by referring to FIG. 8. The second unit 30 is held securely in position until it is released by the engagement release button 252.

To use the electronic apparatus 10 shown in FIG. 1 in the second closed status (tablet PC mode) shown in FIG. 7, the fixture is rotated such that the second fixture 332b of the fixture member 332 of the attachment unit 33 projects from the aperture 331b (refer to FIG. 5) on the back of the second unit 30. The second unit 30 is rotated such that the display screen 31 faces upward from the first unit 20, and further rotated onto the top of the first unit 20 such that the back of the second unit 30 faces the first unit 20. In this position, the second fixture 332b extends into the engagement hole 251 of the engagement unit 25, thereby securely fixing the apparatus in the tablet mode. Thus, the first unit 20 can be securely held by the fixture member 332 in either the first or second closed positions by rotation of the fixture member. Rotation of the fixture member can be performed by a simple manipulation of the user's fingers, thereby allowing use in either the notebook PC mode and the tablet mode using a single hand.

Described below is another embodiment of the attachment unit.

Figure 14:
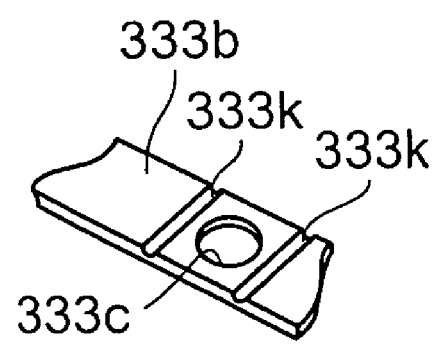
FIGS. 14A and 14B show a cutaway view of a cover member of the attachment unit of FIGS. 12A and 12B.
Figure 14:
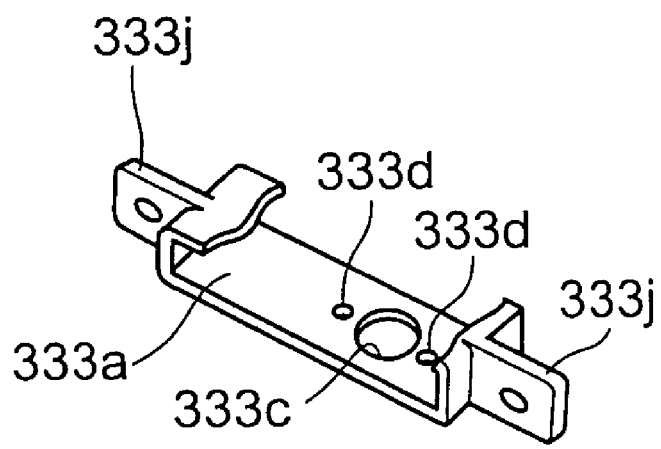
Figure 15:
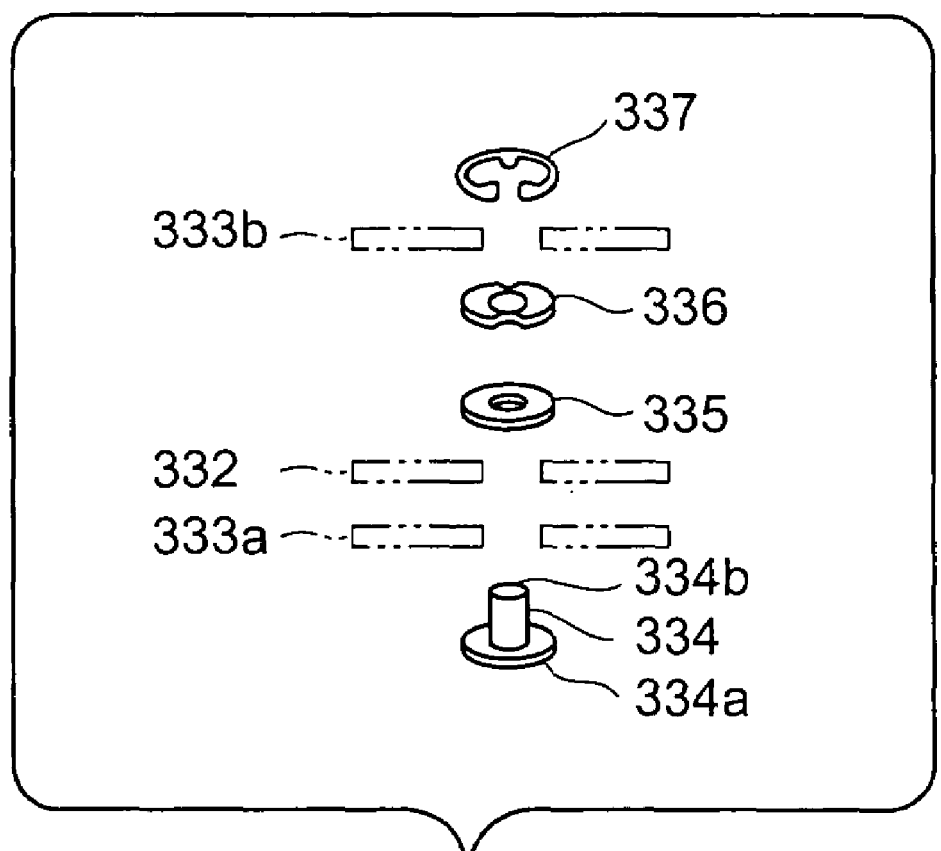
FIG. 15 is an exploded view showing the procedure of assembling the attachment unit.

FIGS. 12A and 12B show opposing sides of another embodiment of an attachment unit of the present invention. FIGS. 13A and 13B show opposing sides of the fixture member forming the attachment unit. FIGS. 14A and 14B show a cover member of the attachment unit. FIG. 15 is an exploded view showing how the attachment unit is assembled.

In this embodiment, the components corresponding to those of the attachment unit explained by referring to FIGS. 9 to 11 are assigned the reference numerals assigned in FIGS. 9 to 11, and the features different from the attachment unit shown in FIGS. 9 to 11 are mainly explained below.

FIGS. 12A and 12B show an attachment unit similar to the one shown in FIGS. 9A and 9B. To the extent the alternative embodiment is the same in function or design as described above, the applicable description is not repeated. However, FIGS. 12A and 12B show a difference in the head section 334a of an axis member 334 (refer to FIG. 15). The axis member 334 is described later.

On the fixture member 332, a bearing hole 332g for insertion of the axis member 334 (refer to FIG. 5) is formed between the first fixture 332a and the second fixture 332b. On the side depicted by FIG. 13A, a circular concave section 332h in which a flat washer 335 (refer to FIG. 15) is engaged is formed. On the side indicated by FIG. 13B, two first concave sections 332d and two second concave sections 332e are formed around the bearing hole 332g. These two first concave sections 332d and two second concave sections 332e are coupled by the arcuate groove 332f shallower than the first concave section 332d and the second concave section 332e. The first concave section 332d and the second concave section 332e are formed in two units, and are formed only on one side of the fixture member 332. Otherwise, they operate in a manner similar to that previously described.

FIGS. 14A and 14B show the cover member of the attachment unit in this alternative embodiment. For illustration purposes, FIG. 14A shows a cutout in a plate section 333b, and FIG. 14B shows the inner side of the plate section 333b which has been cutout.

Figure 13:
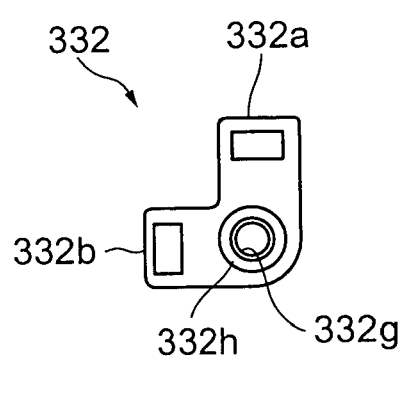
FIGS. 13A and 13B show a fixture member of the attachment unit of FIGS. 12A and 12B.
Figure 13:
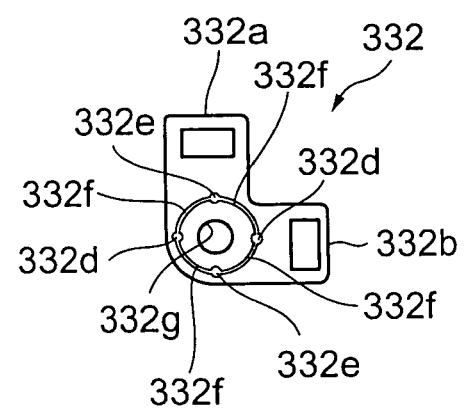

In the alternative embodiment, there are two the convex sections 333d in the plate section 333a which engage either the first concave section 332d or the second concave section 332e (see FIG. 13). Grooves 333k are formed adjacent to both sides of the support hole 333c inside the other plate section 333b to moderate the spring effect of a wavy washer 336 (refer to FIG. 15) by slightly deforming the part sandwiched between the grooves 333k when the fixture member 332 is rotated.

When assembling the attachment unit, the fixture member 332, the flat washer 335, and the wavy washer 336, which functions as a spring, are enclosed between the cover members 333 as shown in FIG. 15. The fixture member 332 is arranged with the side shown in FIG. 13B facing the plate section 333a. The axis member 334 is then inserted through the components and the tip section 334b of the axis member 334 is engaged in an E ring 337. The E ring prevents the axis member 334 from slipping.

In this embodiment, the wavy washer 336 works as a spring, so that it is not necessary to depend on the spring force of the cover member 333, thereby improving the flexibility in selection and design of materials.

[Open/Close Sensor]

When the electronic apparatus 10 is in the notebook PC mode shown in FIG. 1 and in the first closed status shown in FIG. 5 with the power turned on, the internal circuit in the apparatus causes it to enter "standby" status. On the other hand, when the electronic apparatus 10 is in the notebook PC mode shown in FIG. 1 and in the second closed status shown in FIG. 7, such that it enters the tablet mode, the orientation of the image on the display screen 31 in the notebook PC mode is rotated by 90°. To realize these functions, the electronic apparatus 10 shown in FIG. 1 is provided with an open/close sensor for detecting whether the apparatus is opened or closed, as described below.

Figure 16:
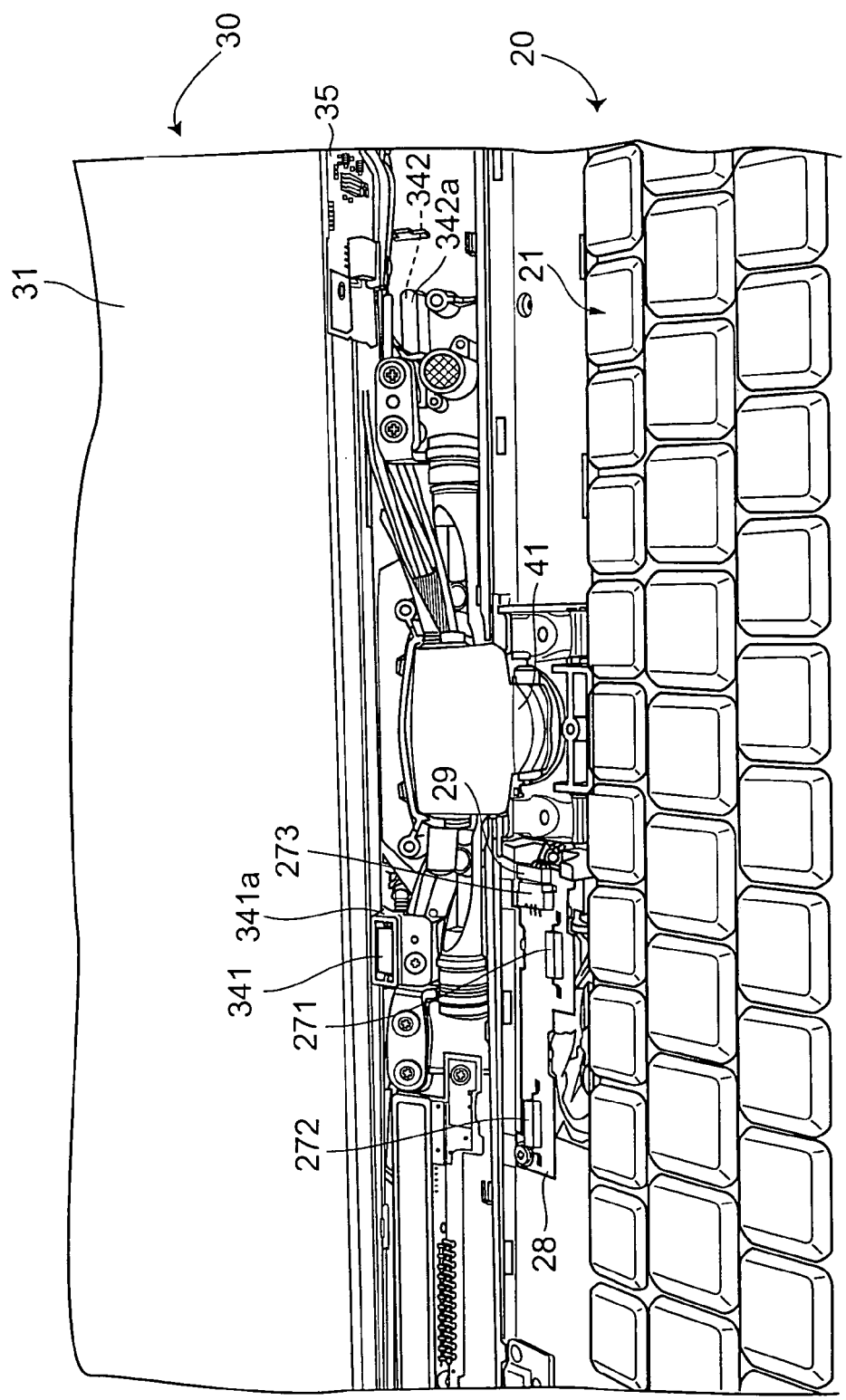
FIG. 16 is an enlarged view of the vicinity of the coupling section of the electronic apparatus shown in FIG. 1.

FIG. 16 is an enlarged view of the vicinity of the coupling section 40 of the electronic apparatus 10 shown in FIG. 1.

FIG. 16 shows the electronic apparatus 10 in the first closed status with the display screen 31 facing the keyboard 21, without a cover at the back portion of the keyboard 21 and the lower portion of the display screen.

A circuit substrate 28 is provided with a first magnetic sensor 271 and a second magnetic sensor 272 adjacent to the rotation axis 41. In this structure, both the first magnetic sensor 271 and the second magnetic sensor 272 are positioned on a circuit substrate 28 to facilitate positioning of the sensors and, thereby, reducing the cost of manufacture.

The circuit substrate 28 is also provided with a connector 273 for transmission of a detected signal of the first magnetic sensor 271 and the second magnetic sensor 272 to computer circuitry. The connector 273 is combined with a connector 29 connected to the tip of the lead line from the circuit in the first unit first unit 20. Signals from the first magnetic sensor 271 and the second magnetic sensor 272 are transmitted to the circuitry through the connectors 273 and 29.

A first magnet 341 is arranged in the position below the display screen 31 of the second unit 30, which is positioned over the first magnetic sensor 271 when the second unit 30 is closed in the first closed status, as shown in FIG. 5. The first magnet 341 is in a case 341a with an opening which allows it to provide a strong magnetic force in the direction of the display screen 31.

By changing the electronic apparatus 10 from the open status shown in FIG. 1 to the first closed status shown in FIG. 5, the first magnet 341 comes into position adjacent to the first magnetic sensor 271. The first magnetic sensor 271 detects the magnetic force, and the first closed status is thereby detected.

A second magnet 342 is positioned on other side of the rotation axis 41. The back of a case 342a holding the second magnet 342 is shown in FIG. 16. The case 342a has an aperture (not shown) on the back of the display screen 31, and the second magnet 342 is exposed from the aperture toward the back of the display screen. Therefore, the second magnet 342 has strong magnetic force away from the display screen.

In FIG. 16, a circuit substrate 35 is lifted out of the way to reveal the position of the second magnet 342. However, the circuit substrate 35 is arranged in a position in which the back of the case 342a storing the second magnet 342 is hidden.

Figure 17:
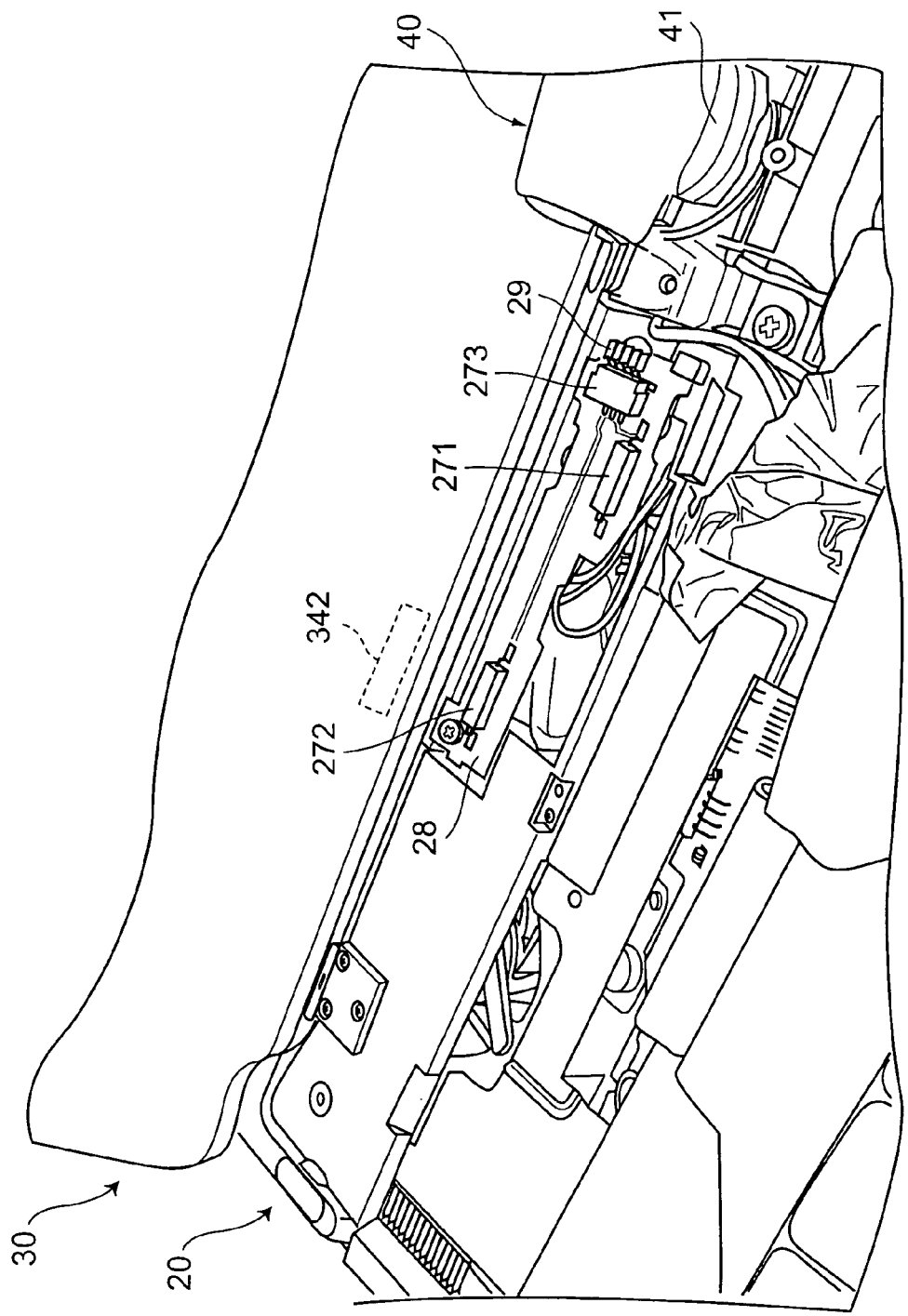
FIG. 17 shows the status in which the second unit is rotated by 180° to allow the back of the second unit to face the keyboard switched from the status shown in FIG. 16.

FIG. 17 shows the second unit 30 (display screen 31) rotated by 180° to allow the back of the second unit 30 to face the keyboard 21.

As shown in FIG. 17, when the back of the second unit 30 faces the first unit 20, the second magnet 342 is moved to a position corresponding to the second magnetic sensor 272. The material of the back cover of the second unit 30 is selected to allow the magnetic force to pass without appreciable reduction in intensity, such that when the second unit 30 is laid on the first unit 20 with the back cover facing the first unit, the second magnet 342 is positioned adjacent to the second magnetic sensor 272, and the second closed status (tablet mode) can be detected.

Figure 18:
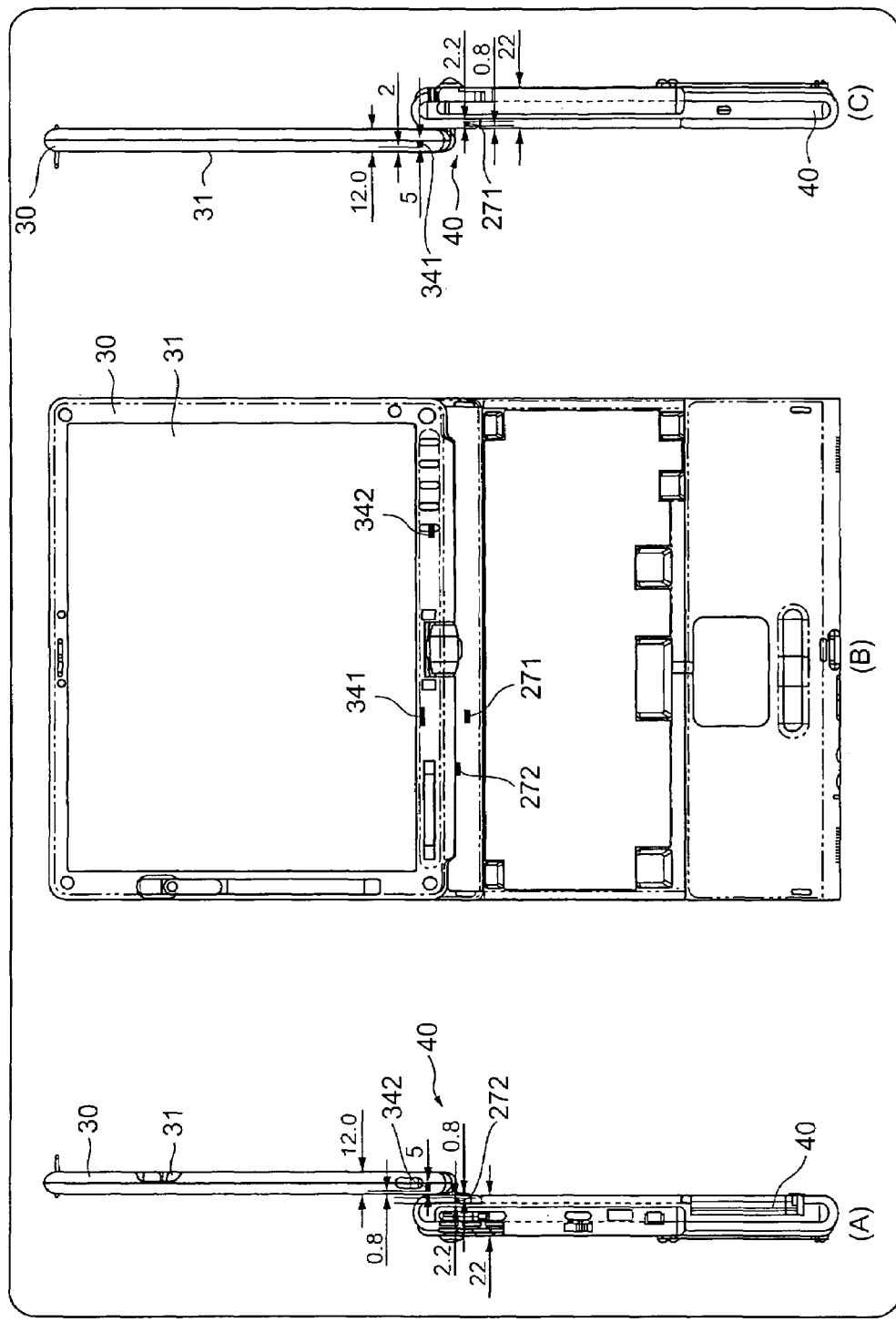
FIGS. 18A, B and C show views in which the second unit is opened by 180° relative to the first unit.

FIGS. 18A-C shows the second unit 30 opened by 180° relative to the first unit 20. FIG. 18A is a left side view, FIG. 18B is a plan view, and FIG. 18C is a right side view.

In the present example, the thickness of the first unit 20 is 22 mm, and the first magnetic sensor 271 and the second magnetic sensor 272 are positioned 0.8 mm deeper than the surface of the keyboard of the first unit 20. The magnetic sensors 271 and 272 are each 2.2 mm thick. Thus, the first magnetic sensor 271 and the second magnetic sensor 272 are positioned close to the surface of the keyboard within the thickness of the first unit 20.

Also in the present example, the thickness of the second unit 30 is 12 mm, and the first magnet 341 is arranged at a depth of 2 mm from the surface of the display screen 31 of the second unit 30. The thickness of the first magnet 341 is 5 mm including the case 341a. Thus, the first magnet 341 is positioned closed to the surface of the display screen 31 within the thickness of the second unit 30.

The second magnet 342 is positioned 0.8 mm from the back of the second unit 30, and the thickness of the second magnet 342 is 5 mm including the case 342a. Thus, the second magnet 342 is positioned closer to the back, within the thickness of, the second unit 30.

Therefore, in the first closed status, the first magnet 341 is close to the first magnetic sensor 271 and applies strong magnetic force to the first magnetic sensor 271. In the second closed status, the second magnet 342 is close to the second magnetic sensor 272, and applies strong magnetic force to the second magnetic sensor 272. Thus, according to the embodiment, when the electronic apparatus is closed in either the first or second closed status, a strong magnetic force is applied to one or the other of the magnetic sensors, with a high signal to noise ratio.

In this embodiment, the residual flux density Br of the first magnet 341 and the second magnet 342 is Br=0.41 to 0.43 (T). When the first closed status is entered, the first magnetic sensor 271 detects the magnetic force of the first magnet 341 when the space between the longest portions (near the engagement unit 25 and the attachment unit 33) from the coupling section 40 reaches 15 mm to 30 mm. When the second closed status is entered, the second magnetic sensor 272 detects the magnetic force of the second magnet 342 when the space reaches 20 mm to 40 mm.

The first magnetic sensor 271 and the second magnetic sensor 272 are placed on the side of the coupling section 40 beyond the keyboard 21. Therefore, the wrist of a user is unlikely to be placed near the magnetic sensor in the normal use. This minimizes the possibility that a user with a magnetic bracelet can cause a false detection signal.

[Display Panel Fixed Structure]

Figure 19:
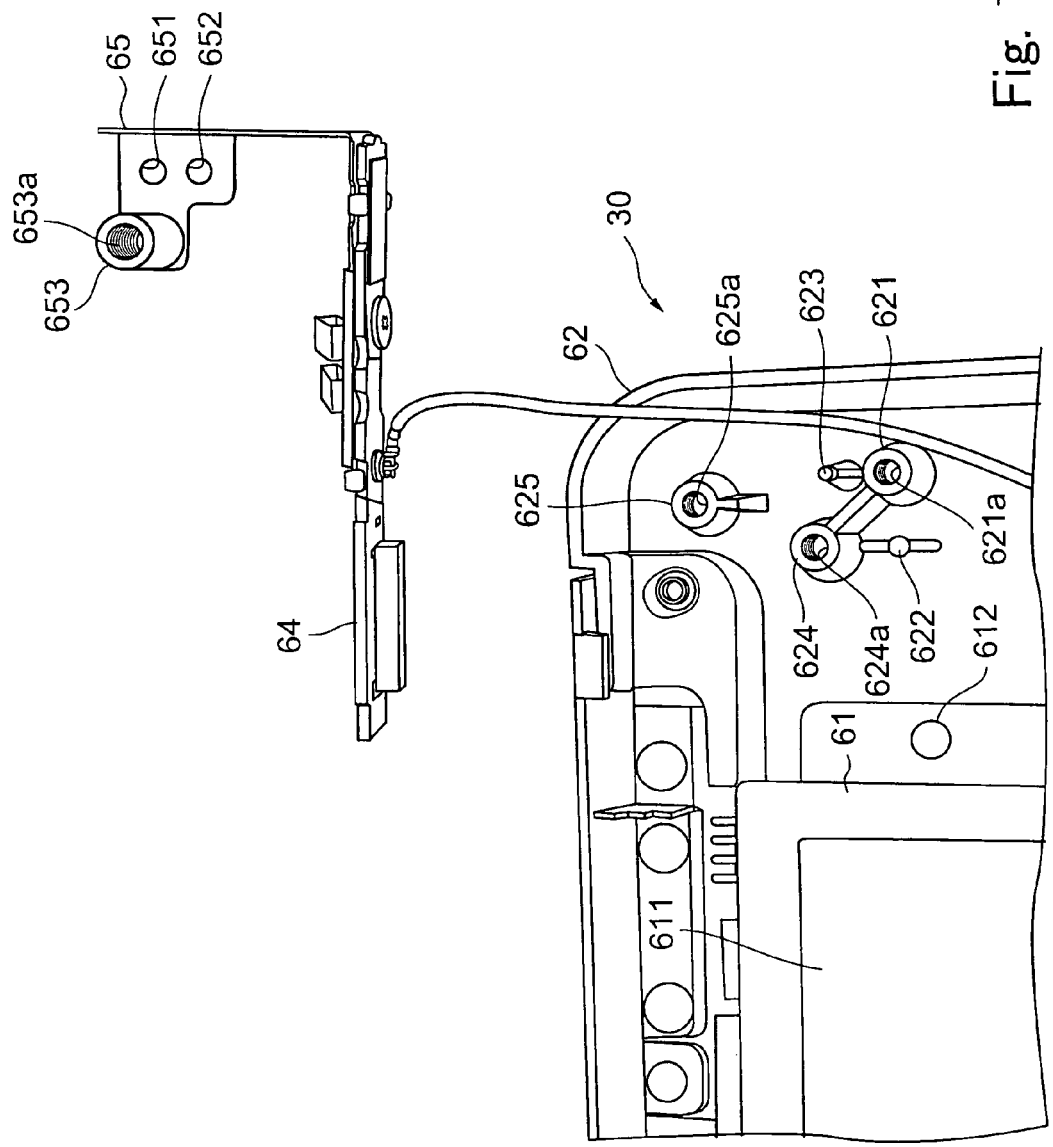
FIG. 19 shows the upper right portion of the back cover and the display panel of the second unit of the electronic apparatus shown in FIG. 1.

FIG. 19 shows the upper right portion of the back cover and the display panel of the second unit 30 of the electronic apparatus 10 shown in FIG. 1. In FIG. 19, an antenna 64 and a fixing part 65 indicate the status prior to the engagement in a back cover 62, and the display panel 61 is also not in final position.

Figure 20:
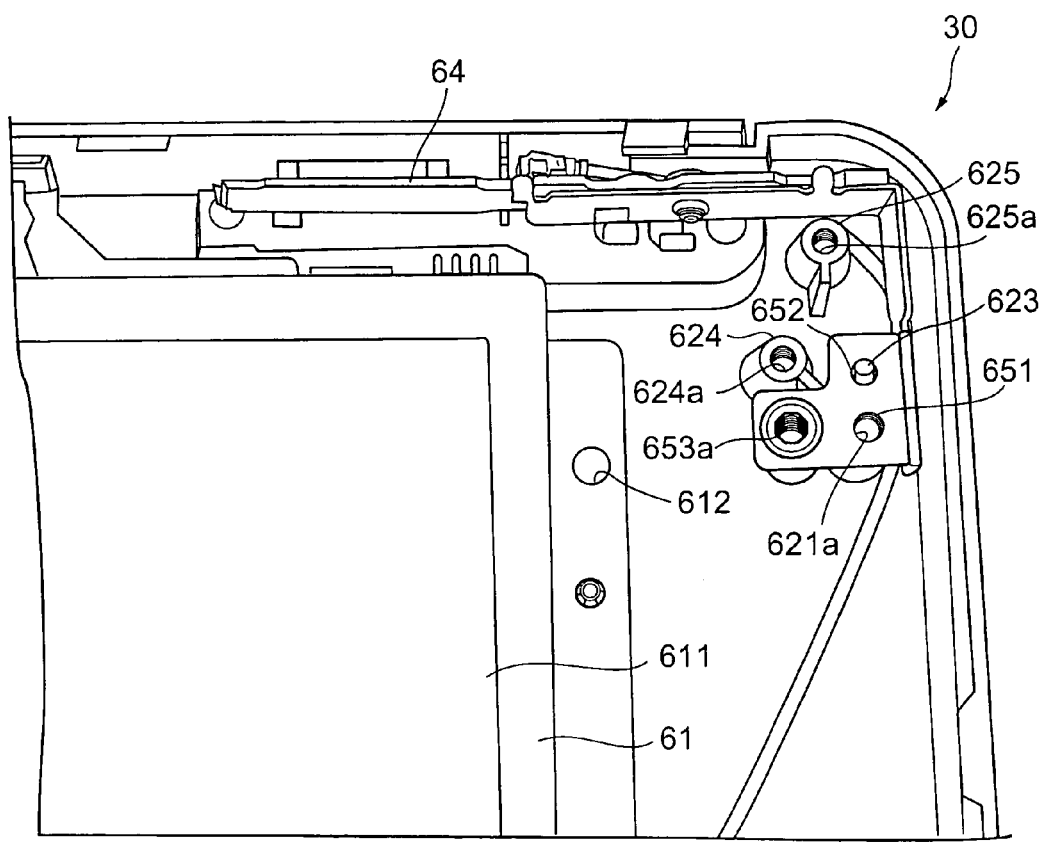
FIG. 20 shows the same portion as FIG. 19, and shows the antenna and the fixing part in the normal positions.
Figure 21:
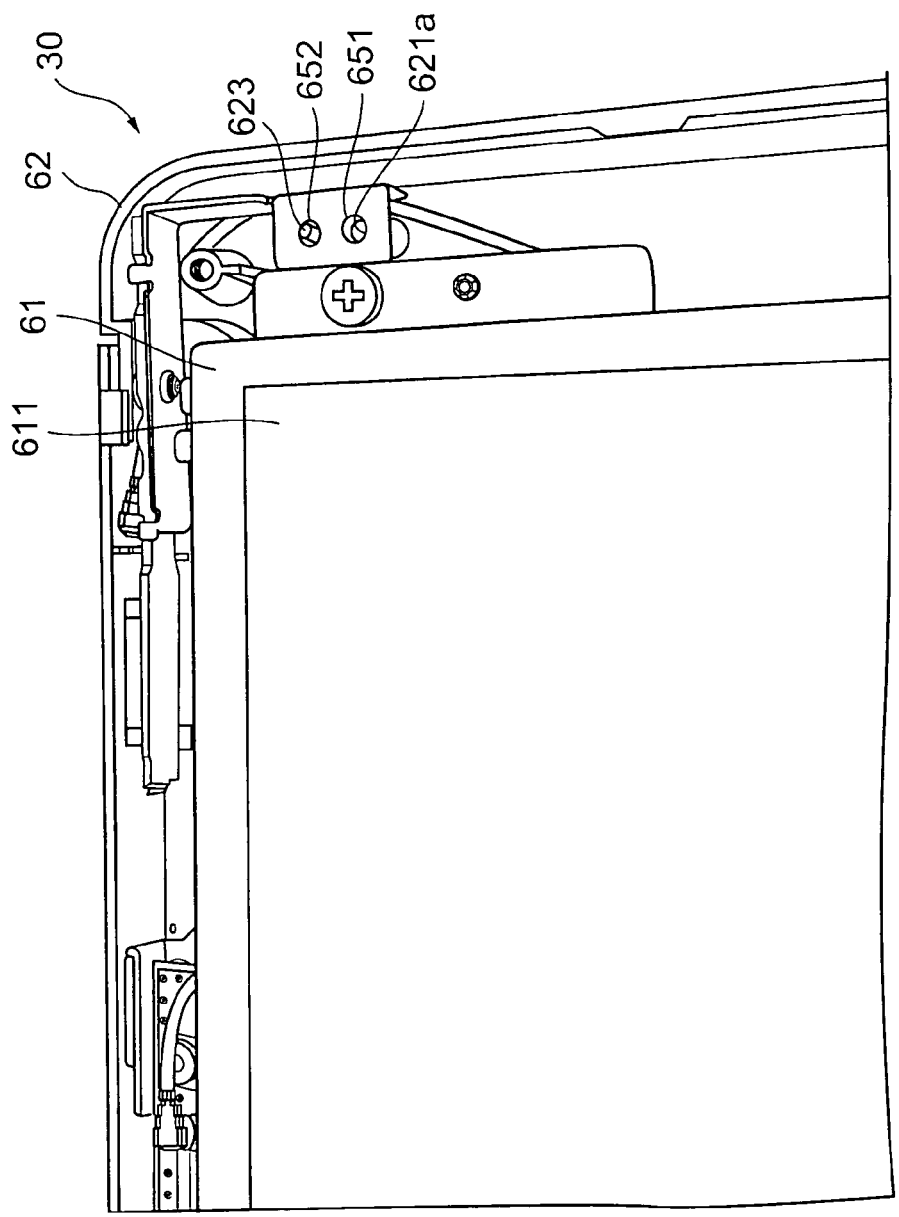
FIG. 21 shows the same portion as FIGS. 19 and 20 and the antenna, the fixing part, and the display panel are arranged in the normal positions.

FIG. 20 shows the same portion as FIG. 19, but the antenna 64 and the fixing part 65 in their normal assembled positions. FIG. 21 shows the same portion as FIGS. 19 and 20, with the antenna 64, the fixing part 65, and the display panel 61 all arranged in the normal positions.

The components of the second unit 30 (refer to FIG. 1), i.e., the display panel 61 having the display screen 611 and the back cover 62 covering the back of the display panel 61 are shown. The front side of the display panel 61 is covered with the front cover 63.

As shown in FIG. 19, the antenna 64 is fixed to the fixing part 65. The fixing part 65 is used in fixing the antenna 64, and is also used in fixing the display panel 61. In this embodiment, the method of fixing the display panel 61 using the fixing part 65 is mainly explained.

The display panel 61 has a mounting hole 612 for a screw. On the other hand, a boss 621 having a central screw hole 621a for fixing the display panel 61 is located on the back cover 62. The boss 621 is offset from the mounting hole 612 of the display panel 61. On the central axis of the mounting hole 612, used when the display panel 61 is in the normal position, a positioning pin 622 is located on the back cover 62. In addition, a projection 623 is provided on the back cover 62. Furthermore, a boss 624 having a central screw hole 624a, and a boss 625 having a central screw hole 625a are provided.

The fixing part 65 includes a mounting hole 651 and a positioning hole 652 to which the antenna 64 is fixed, and a boss 653 having a screw hole 653a penetrated at its center. The aperture (see FIG. 19) at the bottom of the screw hole 653a is used as a positioning hole for receiving and engaging the positioning pin 622 of the back cover 62. At its top, the screw hole 653a is used for attachment with the mounting hole 612 of the display panel 61 by screwing them together.

The fixing part 65 is arranged as shown in FIG. 20. The bottom of the screw hole 653a in the boss 653 is for receiving and engaging the positioning pin 622 (refer to FIG. 19). Thus, the mounting hole 651 of the fixing part 65 is arranged on the screw hole 621a at the center of the boss 621 provided for the back cover 62, and the projection 623 provided in the back cover 62 is engaged in the positioning hole 652 of the fixing part 65. The positioning hole 652 of the fixing part 65 is formed large for loose engagement of the projection 623 of the back cover 62, and the mounting hole 651 of the fixing part 65 is also formed large for the diameter of the central screw hole 621a of the boss 621 provided in the back cover 62. Correspondingly, the diameter of the screw hole 653a penetrated at the center of the boss 653 of the fixing part 65 matches the positioning pin 622 of the back cover 62 in dimension. Therefore, the screw hole 653a in the center of the boss 653 of the fixing part 65 is arranged in the correct position for the positioning pin 622 of the back cover 62.

As shown in FIG. 21, the mounting hole 612 (refer to FIG. 20) of the display panel 61 is placed and screwed into the screw hole 653a of the fixing part 65. At this time, the mounting hole 612 of the display panel 61, the screw hole 653a in the center of the boss 653 of the fixing part 65, and the positioning pin 622 of the back cover 62 are coaxial.

The boss 621 for fixing the display panel 61 is provided on the back cover 62 in the position off the mounting hole 612 of the display panel 61 as described above. However, the positioning pin 622 is set on the same central axis as the mounting hole 612 of the display panel 61 when the display panel 61 is arranged in the normal position on the back cover 62, and the positioning pin 622 is engaged in the positioning hole (aperture at the bottom of the screw hole 653*a* in the center of the boss 653) of the fixing part 65, and the mounting hole 612 of the display panel 61 is screwed to the screw hole (aperture at the upper portion of the screw hole 653*a* in the center of the boss 653) coaxial with the positioning hole (aperture at the bottom portion), thereby fixing the display panel 61 in the normal position with high precision.

In the embodiment described above, only one type of the display panel 61 is shown, but another type of display panel having a different mounting hole position can be incorporated into the back cover having the same structure. The other type of display panel is directly screwed into the screw hole 624*a* when a mounting hole is positioned in the same central axis as the screw hole 624*a* in the center of the boss 624 (refer to FIG. 19) and the display panel is incorporated.

If a boss for screwing the display panel 61 of the type shown in FIG. 19 is located in the position of the positioning pin 622 of the back cover 62, then the boss would interfere with the display panel of the type which directly screws into the screw hole 624*a*. Therefore, such a display panel cannot be incorporated. Therefore, in the illustrated embodiment, the positioning pin 622 is set in the position corresponding to the mounting hole 612 of the display panel 61, and the screw hole 621*a* for fixing the display panel 61 to the back cover 62 is provided in the boss 621 arranged in a different position, and the connections are made by the fixing part 65. In connecting the fixing part 65, the screw hole 653*a* in the boss 653 of the fixing part 65 is registered with the positioning pin 622 of the back cover 62 as described above, and attachment can be made with almost the same high position precision as the configuration of directly screwing into the central screw hole provided to the back cover 62.

When a display panel of the type which directly screws into the central screw hole 624*a* of the boss 624 is incorporated into the central screw hole 624*a*, the boss 653 or a metal fixture having no planar portion for fixture of the boss 653 is used instead of the fixing part 65 with the structure shown in FIG. 19. This is because the display panel of the type which directly screws into the central screw hole of the boss 624 interferes when a boss is set in the position of the positioning pin 622 of the back cover 62, and the spread of the fixing part as describe above interferes with the incorporation of the display panel.

Another boss 625 shown in FIGS. 19 to 21 is used in fixing the front cover 63 (refer to FIG. 1).

FIGS. 19 to 21 show the fixed structure of the upper right portion of a display panel. The structure at the upper left portion of the display panel is almost the same as the structure at the upper right portion, except there is no antenna, and therefore, need not be further described.

FIGS. 22 to 25 show the fixed structure of the lower left portion of the display panel.

Figure 22:
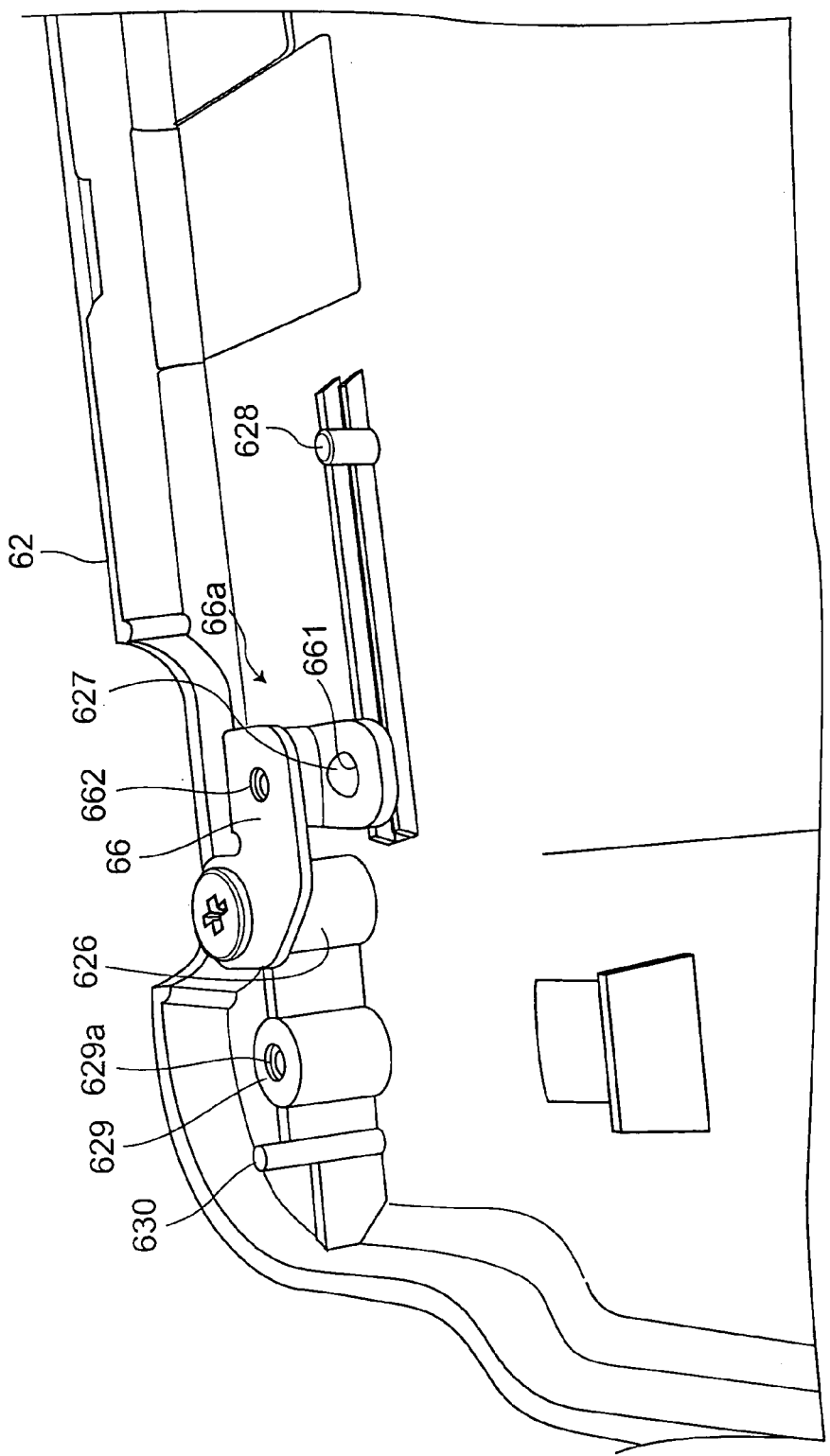
FIG. 22 shows the structure of the lower left portion of the display panel.
Figure 23:
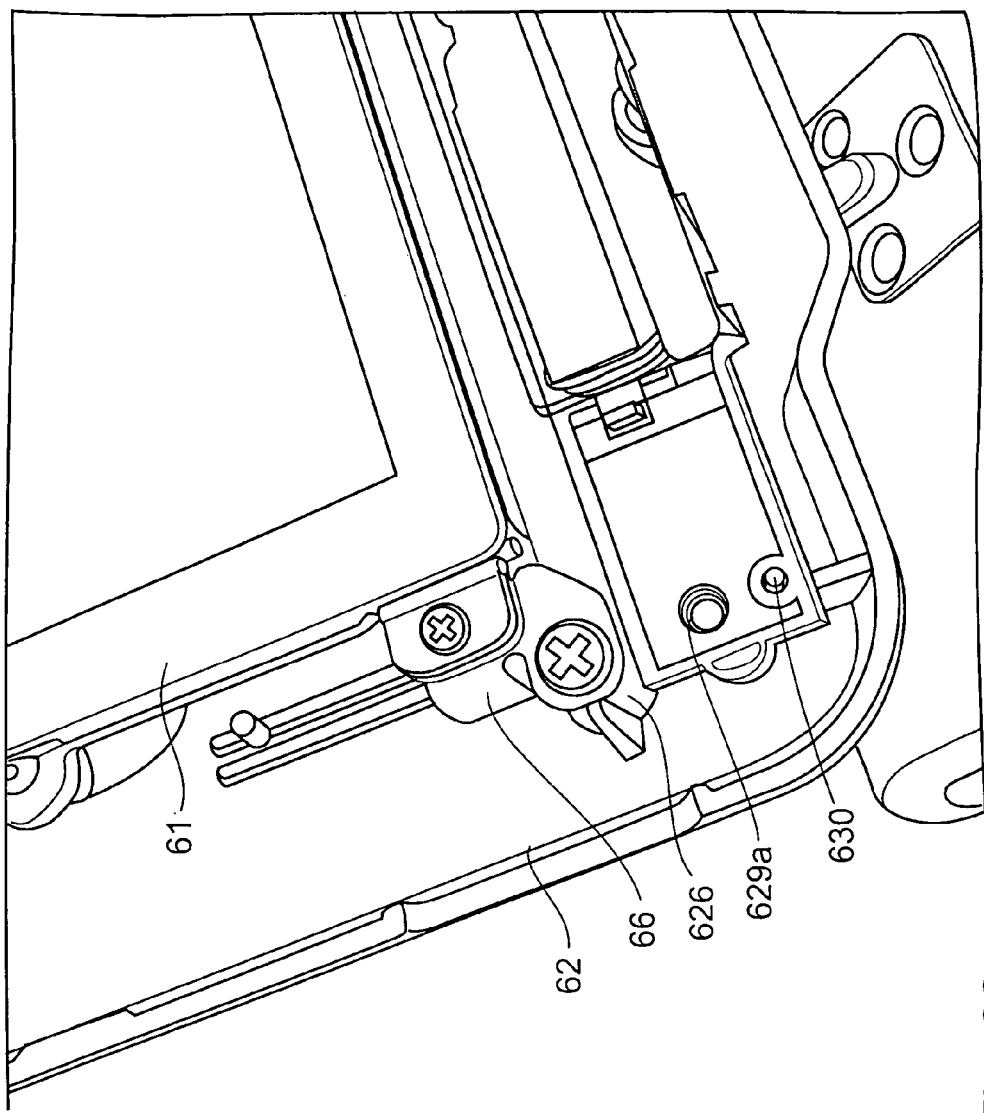
FIG. 23 shows the structure of the lower left portion of the display panel.
Figure 24:
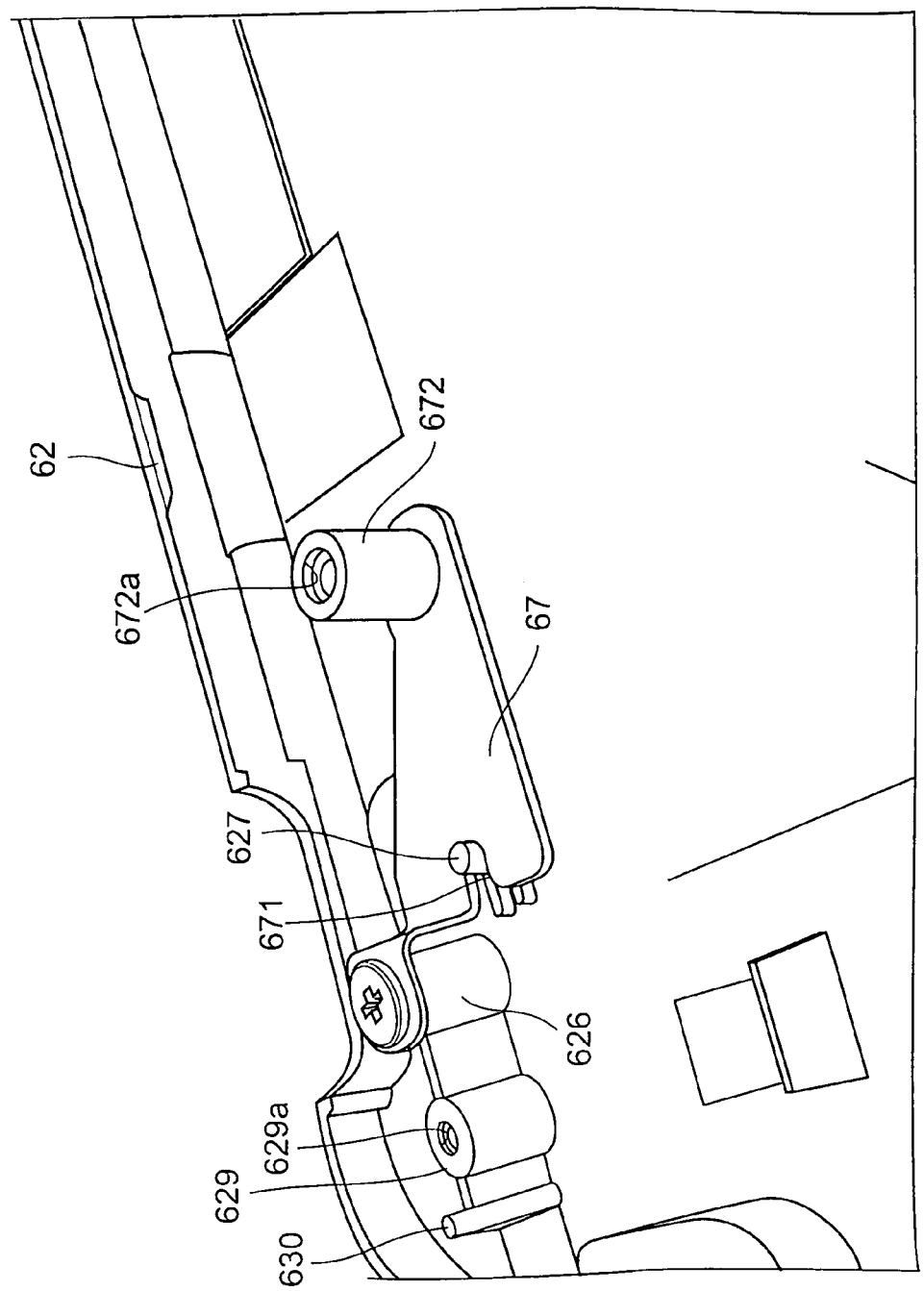
FIG. 24 shows the structure of the lower left portion of the display panel.
Figure 25:
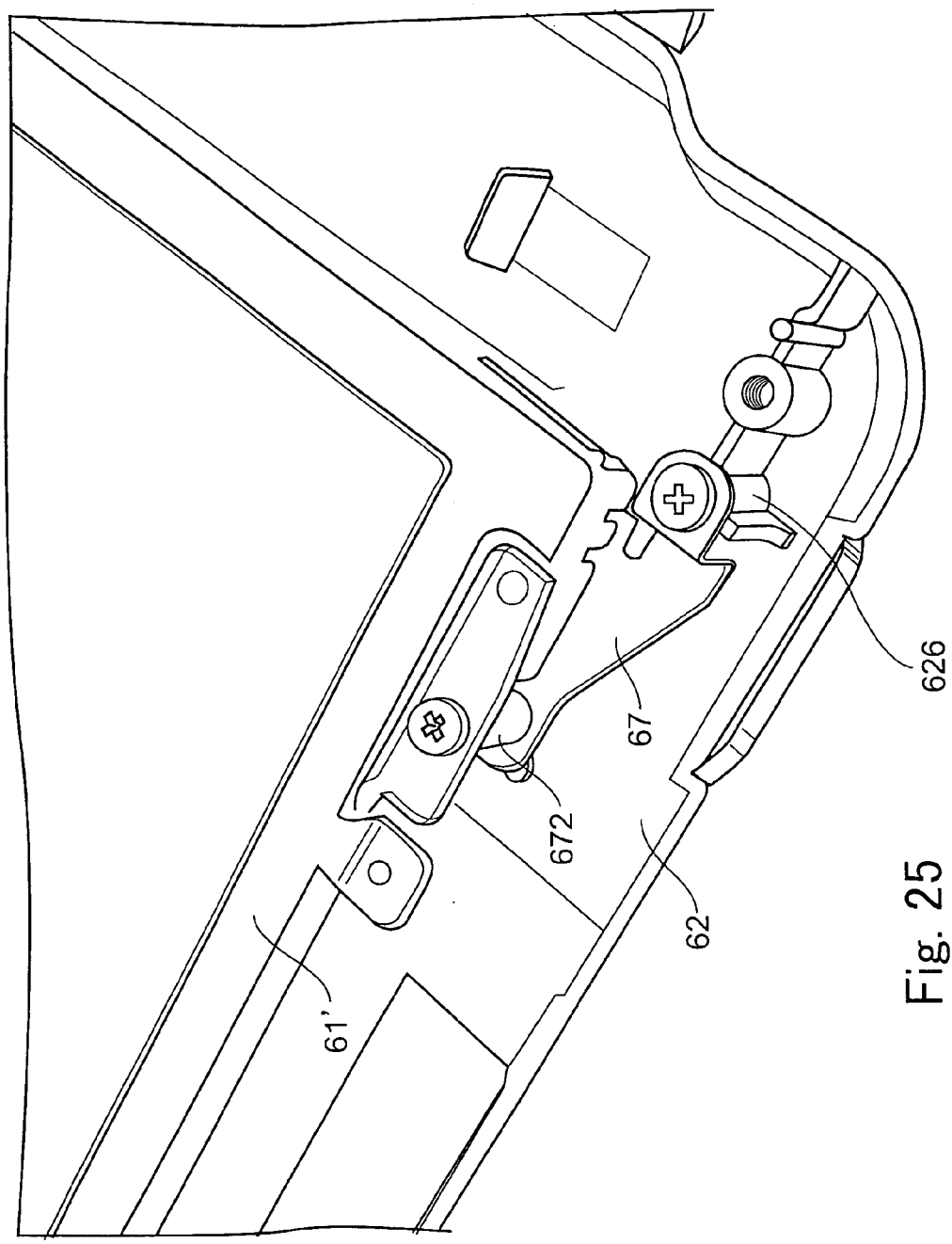
FIG. 25 shows the structure of the lower left portion of the display panel.

FIG. 22 shows the back cover; FIG. 23 shows the display panel attached to the back cover; FIG. 24 shows another type of fixing part for fixing another type of display panel; and FIG. 25 shows another type display panel different from the display panel shown in FIG. 23, attached using the fixing part shown in FIG. 24.

As shown in FIG. 23, the back cover 62 is provided with a boss 626 having a central screw hole for screwing a fixing part 66, and is also provided with two positioning pins 627 and 628. The back cover 62 is also provided with other boss 629 having a central screw hole 629*a* and projection 630. They are used for attaching other parts as described later, and are not related to mounting the display panel.

The positioning pin 627 is used to fix a display panel including a mounting hole positioned on the same central axis as the positioning pin 627. The positioning pin 628 is used to fix a display panel in which a mounting hole is arranged on the same central axis as the positioning pin 628.

The fixing part 66 shown in FIG. 22 has a mounting hole which has already accepted a screw and, therefore the mounting hole is hidden from view. A positioning hole 661 is engaged with the positioning pin 627. The part 66 includes a screw hole 662 to which the mounting hole of the display panel is screwed. A fixing part 66 has a bent portion 66*a* having two plates bent to face each other, with the positioning hole 661 formed on the lower plate, and the screw hole 662 is formed in the upper plate. The screw hole 662 is on the same central axis as the positioning hole 661. In the fixing part 66, the diameter of the positioning hole 661 matches the diameter of the positioning pin 627, and the screw hole 662 can be positioned with high position precision.

FIG. 23 shows the display panel 61 in which the mounting hole is screwed to the screw hole 662 of the fixing part 66 shown in FIG. 22, and the mounting hole (already screwed, and hidden below the screw) of the display panel 61, the screw hole 662 of the fixing part 66 shown in FIG. 22, the positioning hole 661, and the positioning pin 627 of the back cover 62 are all on the same central axis, thereby screwing the display panel 61 with high position precision.

As shown in FIG. 23, other parts are arranged on another boss 629 provided on the back cover 62 and the projection 630 (refer to FIG. 22), and the front cover 63 (refer to FIG. 1) is further arranged on them. The front cover 63 is screwed to the screw hole 629*a* of the boss 629 with the other parts.

The fixing part 67 shown in FIG. 24 is a fixing part for fixing another type of display panel. As with the fixing part 66 shown in FIG. 22, a mounting hole (as in the case shown in FIG. 22, it is already screwed, and the mounting hole is hidden below the screw) screwed into the central screw hole (not shown) of the boss 626 of the back cover 62 is provided. The fixing part 67 shown in FIG. 24 includes a cutout 671 into which the positioning pin 627 is engaged to position the fixing part 67. Furthermore, the fixing part 67 is provided with a boss 672 having a central screw hole 672*a*. The aperture of the bottom portion of the screw hole 672*a* of the boss 672 is used as a positioning hole in which the positioning pin 628 (refer to FIG. 22) provided in the back cover 62 is engaged. The aperture at the upper portion shown in FIG. 24 of the screw hole 672*a* is used as a screw hole for screwing the mounting hole of a display panel.

FIG. 25 shows a display panel 61' in which a mounting hole is screwed to the screw hole of the boss 672 of the fixing part 67 shown in FIG. 24. The mounting hole (already screwed and is hidden below the screw) of the display panel 61', the screw hole 672*a* of the boss 672 of the fixing part 67 shown in FIG. 24, and the positioning pin 628 of the back cover 62 are all on the same central axis, and the display panel 61' is fixed with high position precision.

No boss is provided in the positions of the two positioning pins 627 and 628 of the back cover 62 shown in FIG. 22 for the same reason as there is no boss in the position of the positioning pin 622 shown in FIG. 19. If a boss is set in the position of the positioning pin 627 shown in FIG. 22, it would interfere with the display panel 61' such that the display panel 61' could not be incorporated. Likewise, if a boss is set in the position of the positioning pin 628 shown in FIG. 22, it would interfere with the display panel 61 shown in FIG. 23, such that the display panel 61 could not be incorporated. In this embodiment, the positioning pins 627 and 628 are provided on the same central axis as the mounting hole of the display panel, and either the positioning pin 627 is engaged in the positioning hole 661 of the fixing part 66 shown in FIG. 22, or the positioning pin 628 is engaged at the bottom of the screw hole 672a of the boss 672 of the fixing part 67, as shown in FIG. 24. Therefore, either of the display panels 61 and 61' can be mounted with high position precision although a boss is set in a position different from the position of the mounting hole of the display panel.

[Arrangement of External Coil]

Figure 26:
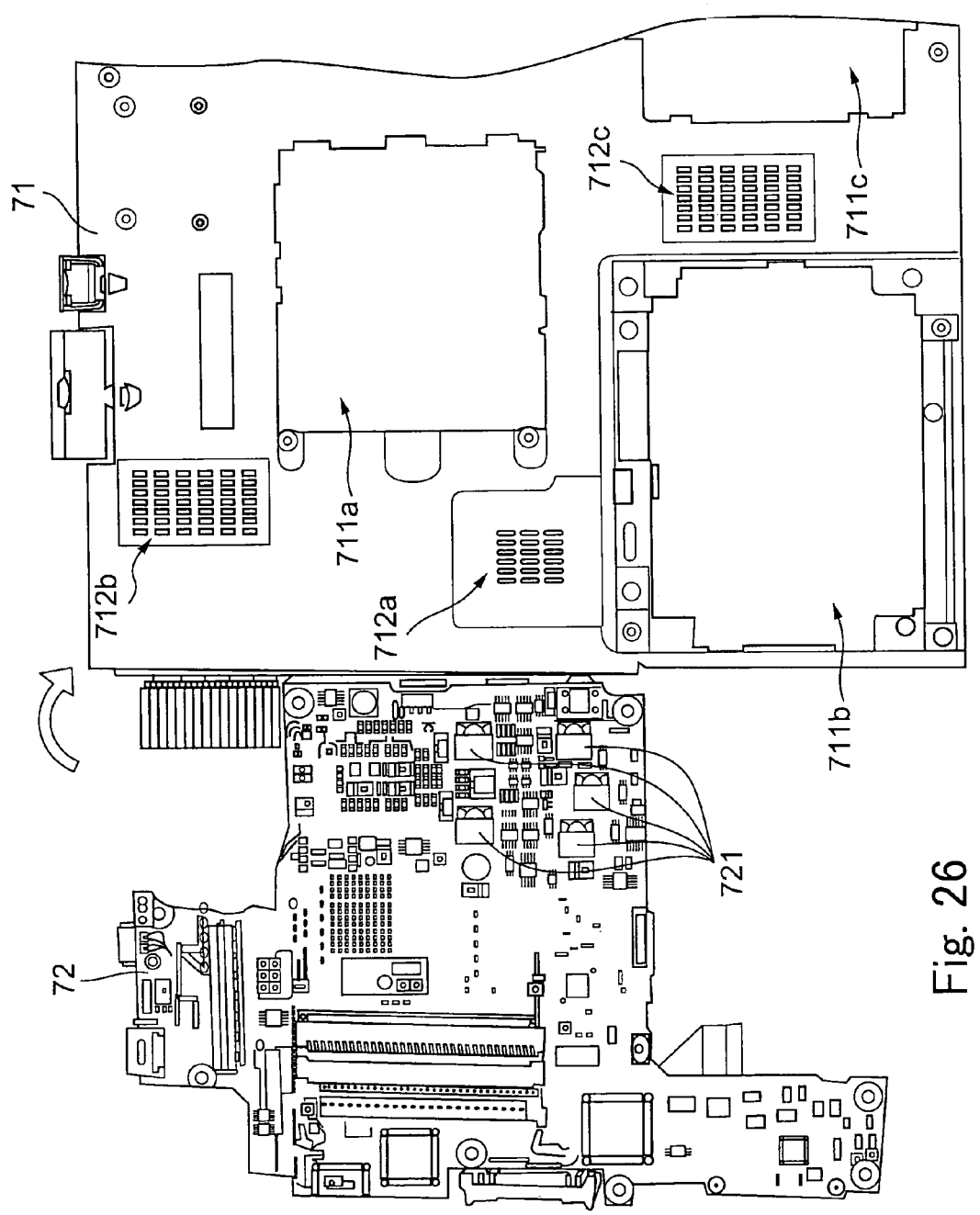
FIG. 26 shows a part of a bottom cover of the first unit of the electronic apparatus shown in FIG. 1, and a circuit substrate arranged on the bottom cover.

FIG. 26 shows a part of a bottom cover 71 of the first unit 20 of the electronic apparatus 10 shown in FIG. 1, and a circuit substrate 72 arranged on the bottom cover.

The first unit 20 of the electronic apparatus 10 shown in FIG. 1 includes the bottom cover 71 shown in FIG. 26, the circuit substrate 72 arranged on the bottom cover 71 and other parts not shown in the attached drawings, and the upper cover 73 (refer to FIG. 1) including the keyboard 21 (refer to FIG. 1), etc.

As shown in FIG. 26, the bottom cover 71 is provided with some apertures 711a, 711b, and 711c and air holes 721a, 721b, and 721c for circulation of air.

The circuit substrate 72 includes various circuits, and is, for example illustrated here, four DC-DC converters. FIG. 26 shows a total of five external coils 721 for four DC-DC converters together with many other circuit units.

FIG. 26 shows the inner side of the bottom cover 71, and the side of the bottom cover of the circuit substrate 72. This circuit substrate 72 is arranged on the bottom cover 71 such that the face shown in FIG. 26 faces the bottom cover 71 as indicated by arrow in FIG. 26.

Figure 27:
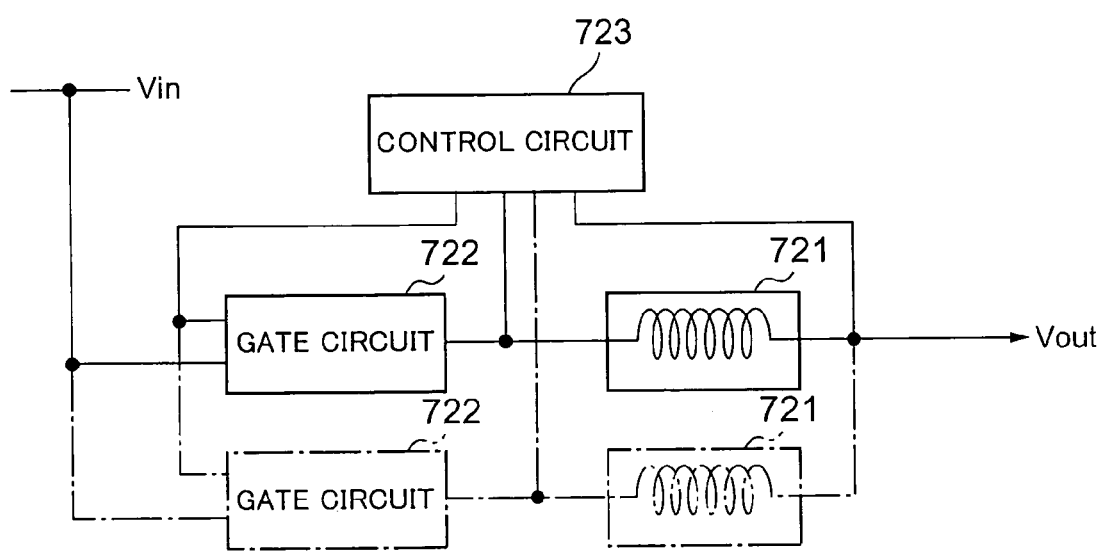
FIG. 27 is a block diagram of the DC-DC converter.

FIG. 27 is a rough block diagram of the DC-DC converter.

Power supply of input voltage Vin of 19V is applied when the electronic apparatus 10 is connected to an AC power supply, or power supply of the voltage of 10.8V is applied when a battery (not shown) is used. In either case, the power supply voltage is input to a gate circuit 722. The gate circuit 722 turns the input power on and off at the frequency of, for example, about 250 to 400 kHz under the control of an external coil 721, uses an external coil 721 to generate predetermined DC voltage Vout. In the case of a DC-DC converter requiring large electric power, the gate circuits 722 and the external coils 721 are connected in parallel. The DC-DC converter itself is a well known technique, and no further explanation about the DC-DC converter is required.

As described above, the display panel 61 (refer to FIGS. 19 to 21) has a pen inputting function, and communicates with the pen at a high frequency. Thus, it is susceptible to interference from external rf. Specifically, rf in the range of 270 kHz to 300 kHz, may cause interference with pen operation. Since the DC-DC converter operates in this general frequency range, the external coil 721 functions as an antenna to generate rf noise that potentially could interfere with the open operation.

When the electronic apparatus 10 is operated in the notebook PC mode, the second unit 30 (display screen 31) is open and, therefore, separated from the circuit substrate of the first unit 20. Thus, rf from the coils in the first unit is unlikely to interfere with the display screen 31. In the tablet mode, although the two units are in contact, rf from the coils in the first unit is also unlikely to interfere with the display screen 31 because the circuit substrate in the first unit 20 is positioned on the back of the display screen 31 and thus any rf from the circuit substrate in the first unit 20 must penetrate the base unit to reach the display screen 31. However, in the first closed status, with the display screen 31 lying on directly on the first unit, a keyboard and display monitor can be externally connected such that the electronic apparatus may be operated in this mode. When used in this manner, there is nothing to shield the rf from the circuit substrate from reaching the display screen 31.

In this situation, as shown in FIG. 26, the external coil 721 of the DC-DC converter is loaded on the side facing the bottom cover 71 of the circuit substrate 72. The external coil 721 generates strong noise on the side loaded with the external coil 721, but the noise transmitted to the reverse side of the surface loaded with the external coil 721 on the circuit substrate 72 is substantially attenuated. In this embodiment, the external coil 721 of the DC-DC converter is loaded on the surface facing the bottom cover 71 of the circuit substrate 72. Therefore, although the electronic apparatus is used in the closed status as shown in FIG. 5, interference due to rf noise from the external coil 721 can be prevented.

In this embodiment, all the five external coils 721 are loaded onto the surface facing the bottom cover 71 of the circuit substrate 72. However, when the frequency used in the DC-DC converter is substantially different from the 270 kHz to 300 kHz which is the frequency of easily causing a malfunction of the display panel 61, it is not necessary to position all or some of the coils on the surface facing the bottom cover 71 of the circuit substrate 72. In this embodiment, two of the five external coils 721 are those used in the DC-DC converter operating around 350 kHz and 400 kHz, and these two the external coils may not be positioned on the surface facing the bottom cover 71 of the circuit substrate 72, that is, can be arranged on the keyboard 21 side (refer to FIG. 1) of the circuit substrate 72.

Figure 28:
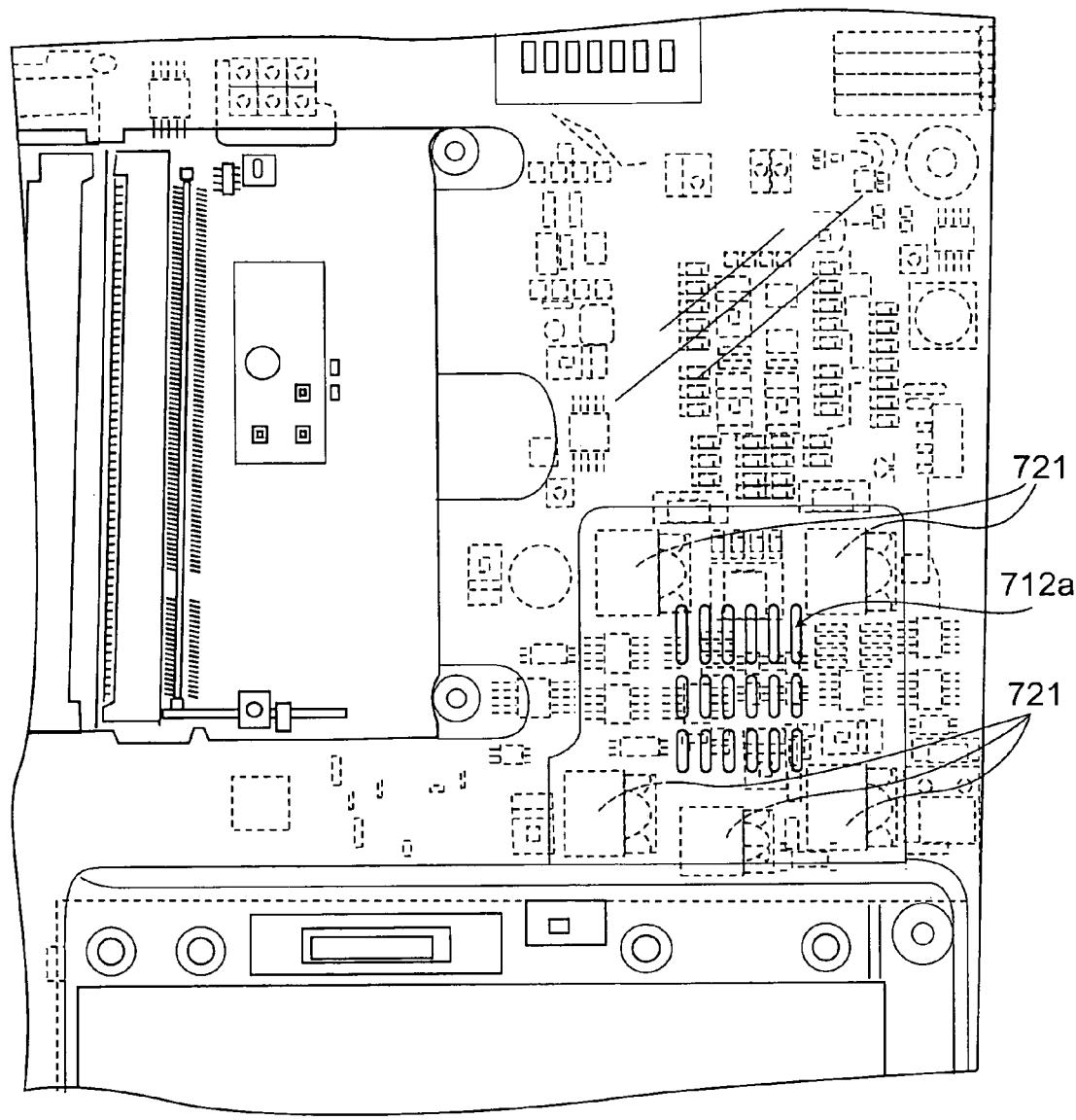
FIG. 28 shows the relative positions of the bottom cover and the external coil viewed from the bottom cover.

FIG. 28 shows the relative positions of the bottom cover and the external coils viewed from the bottom cover.

The five external coils 721 on the circuit substrate 72 are arranged as surrounding the air hole 712a of the bottom cover 71 because the DC-DC converter processes electric power and thus the external coil 721 generates heat. When a heat generating external coil 721 is aligned with the air holes in an array 712a, the flow of air is hindered and the heat dissipation is degraded. Therefore, the five external coils 721 are preferably arranged to surround the air holes 712a, not immediately below (above) the air hole 712a, such that the flow of air is not impeded and necessary cooling can be performed.

[Protection of the Optical Disk]

Figure 29:
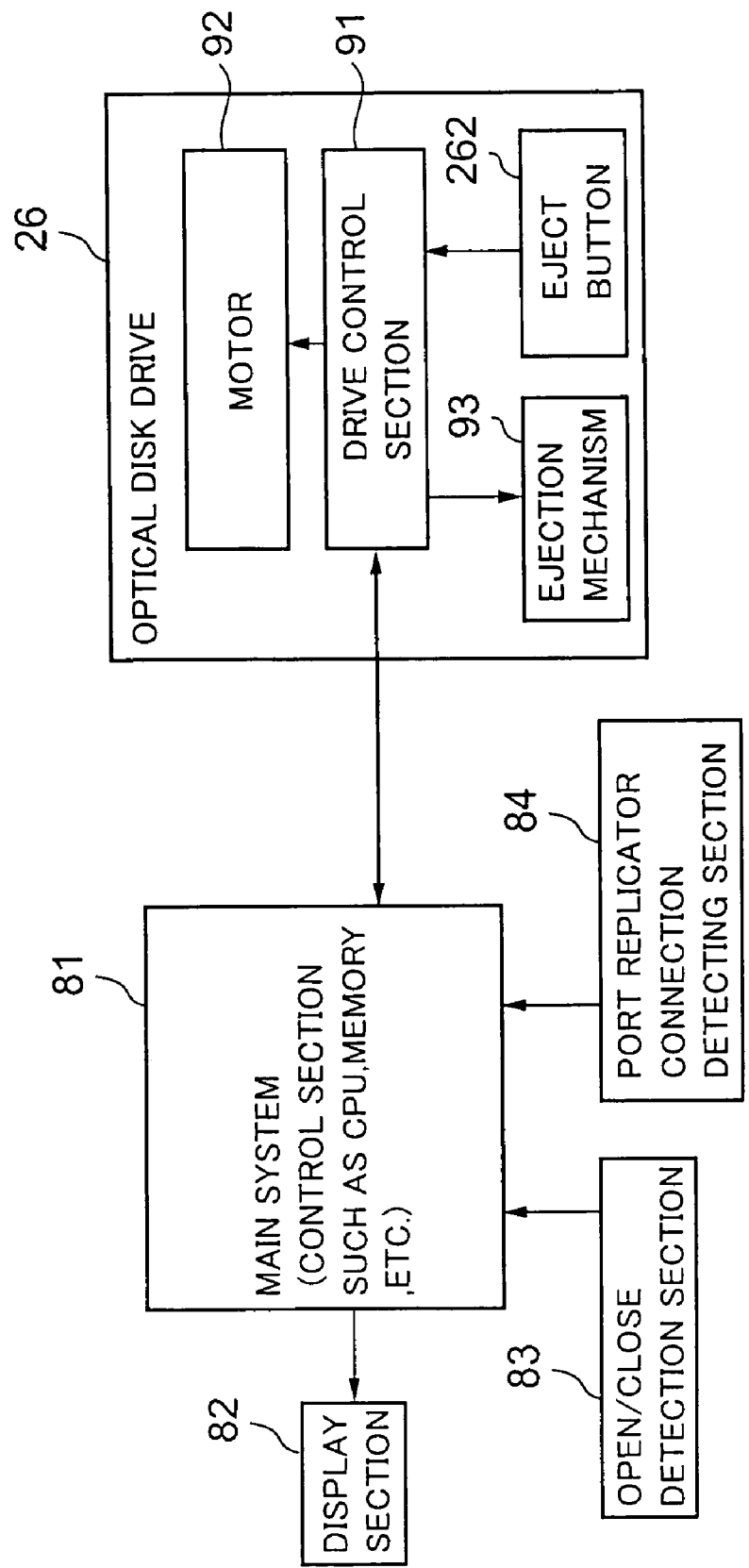
FIG. 29 is a block diagram of a system for controlling the optical disk drive of the electronic apparatus shown in FIG. 1.

FIG. 29 is a block diagram showing the control of the optical disk drive 26 (refer to FIGS. 1 and 2) of the electronic apparatus 10 shown in FIG. 10.

FIG. 29 shows: a main system 81 provided with a control unit having a CPU, memory, etc.; a display section 82 for displaying an image described later on the display screen 31 shown in FIG. 1, in response to an instruction of the main system 81; a open/close detection section 83 for discriminating the open status (refer to FIG. 1), the first closed status (refer to FIG. 5), and the second closed status (refer to FIG. 7) using the magnetic sensors 271 and 272, and the magnets 341 and 342 (refer to FIG. 16), and transmitting them to the main system 81; a port replicator connection detecting section 84 for detecting the attachment of the first unit 20 to the port replicator 50 shown in FIG. 3 and transmitting the information to the main system 81; and the optical disk drive 26 operating under the control of the main system 81. The port replicator connection detecting section 84 detects the connection/disconnection between the connector 51 provided in the port replicator 50 shown in FIG. 3 and the connector (not shown) for coupling with the connector 51 and provided at the bottom of the first unit 20 by detecting the electrical disconnection of one pin.

As shown in FIG. 29, the optical disk drive 26 includes a drive control section 91 for control of the entire optical disk drive; a motor 92 for rotating and stopping an optical disk such as an inserted CD, DVD, etc. under the control of the drive control section 91; as shown in FIG. 1 and FIG. 2, the eject button 262 for issuing an instruction to open, as shown in FIG. 2, the optical disk drive in the status shown in FIG. 1; and an ejection mechanism 93 for projecting the tray of the optical disk drive 26 outward as shown in FIG. 2 under the control of the drive control section 91. In the electronic apparatus shown in FIG. 1, a drive of a tray loading system is adopted as an optical disk drive, but it is obvious that a drive of any other systems using no tray can be applied to the present invention. The present invention can also be applied to a drive for any other storage media such as, in addition to an optical disk, a floppy disk, MO, etc.

In the main system 81, according to the detection results of the open/close detection section 83 and the port replicator connection detecting section 84, it is determined whether or not the electronic apparatus 10 is in the tablet mode as shown in FIG. 7.

In this embodiment, if the port replicator connection detecting section 84 detects that the status is changed from the status in which the electronic apparatus 10 is connected to the port replicator 50 as shown in FIGS. 4 and 5 to the status in which it is disconnected from the port replicator 50 as shown in FIG. 1, and if the open/close detection section 83 detects the second closed status as shown in FIG. 7, then it is determined that the tablet mode is entered. If the open/close detection section 83 does not detect the second closed status as shown in FIG. 7 or the port replicator connection detecting section 84 detects the connection to the port replicator 50 as shown in FIG. 3, then it is determined that the tablet mode is terminated. For more security relating to the control of the optical disk drive 26, it is determined that the tablet mode is entered by the detection of the port replicator connection detecting section 84 about the disconnection from the port replicator or the detection of the open/close detection section 83 about the second closed status as shown in FIG. 7 in controlling the optical disk drive 26.

When the main system 81 determines that the tablet mode is entered or the tablet mode is terminated, the determination result is transmitted to the drive control section 91 of the optical disk drive 26. Upon receipt of the information from the main system 81 that the tablet mode is entered, the drive control section 91 stops the rotation of the motor 92 if it is working, prohibits the rotation, and prohibits the opening operation of the optical disk drive by the ejection mechanism 93 as shown in FIG. 2 even if the eject button 262 is pressed.

When a notification that the tablet mode is terminated is received from the main system 81, the drive control section 91 rotates the motor 92 at the access request from the main system 81 to access an optical disk, or accepts the operation of the eject button 262 to instruct the ejection mechanism 93 to open the optical disk drive as shown in FIG. 2.

The main system 81 also allows the display section 82 to display that the access to an optical disk is prohibited.

Figure 30:
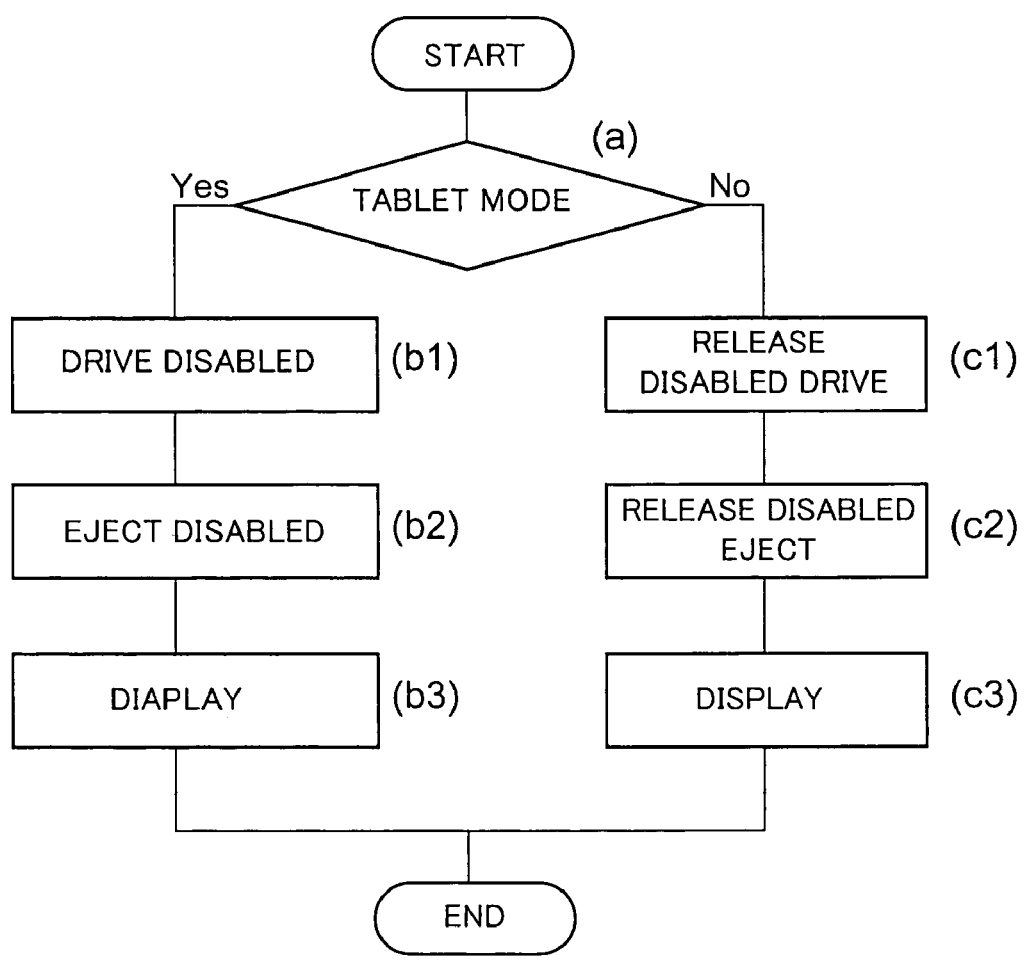
FIG. 30 is a flowchart of a program operating in the CPU of the main system to control the optical disk drive of the electronic apparatus.

FIG. 30 is a rough flowchart of the program operating in the CPU of the main system when the detection result is changed.

The program operates when the open/close detection section 83 shown in FIG. 29 detects the opened/closed status or the port replicator connection detecting section 84 detects the attachment status of the port replicator 50.

The program first determines whether or not the tablet mode is entered (step a). If the tablet mode is entered, the notification that the tablet mode is entered is issued, that is, an instruction to disable the rotation drive of an optical disk by the motor 92 (step b1) and to disable ejection (step b2) is issued, and an instruction to display the information that the optical disk drive 26 is inoperable (step b3) is issued.

If it is determined in step a that the tablet mode is not entered, the notification that the tablet mode is not entered is issued, that is, an instruction to release the prohibition of the drive of an optical disk by the motor 92 (step c1) and to release the prohibition of ejection (step c2) is issued, and an instruction to erase the information that the optical disk drive 26 is inoperable (step c3) is issued.

Described below are various screens displayed when the use of the optical disk drive 26 is prohibited and when the prohibition is released.

Figure 31:
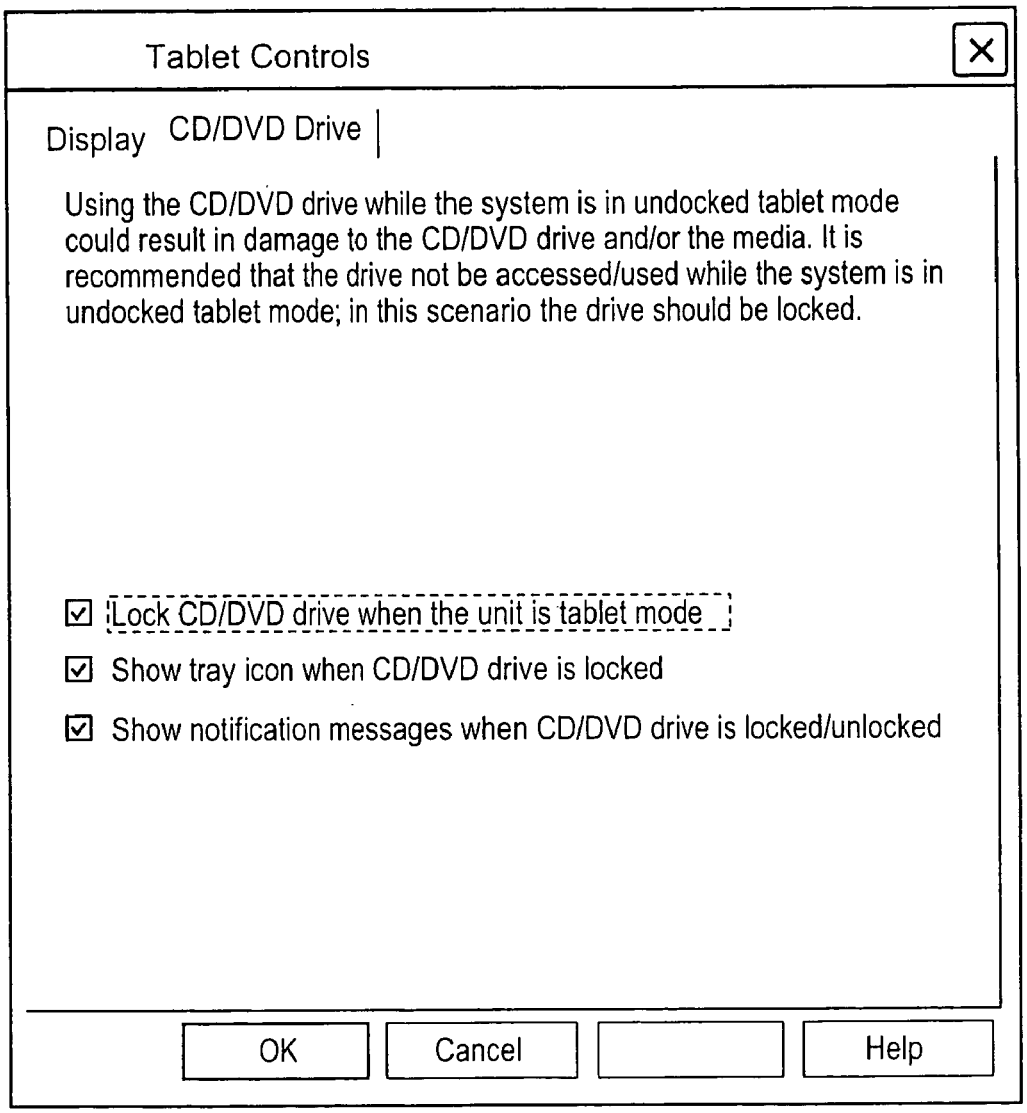
FIG. 31 shows a screen display for enabling the user to control use of the optical disk drive.

FIG. 31 shows the setting screen on which whether or not the function of prohibiting the use of the optical disk drive 26 and the function of releasing the prohibition is used.

In this embodiment, the function according to the flow shown in FIG. 30 can be used by checking the column of "Lock CD/DVD drive when the unit is in tablet mode", and then pressing the "OK" button.

Figure 32:
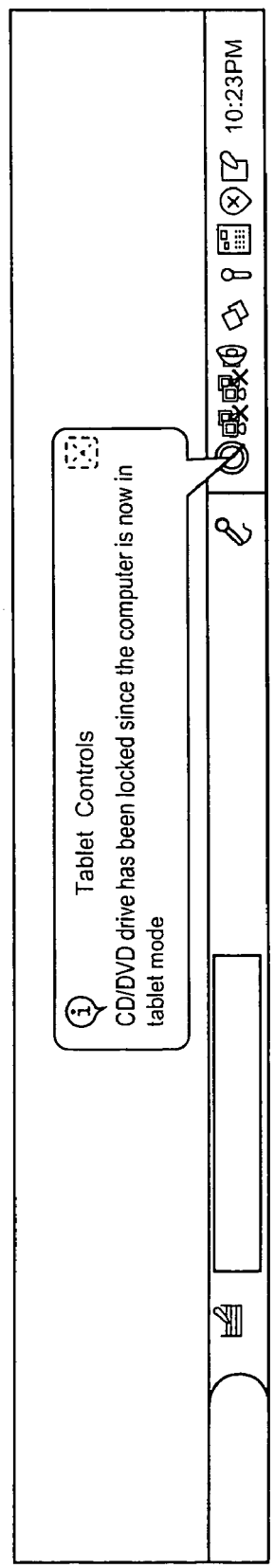
FIG. 32 shows a screen display when the optical disk drive is disabled.

FIG. 32 shows an example of the screen displayed when the optical disk drive transfers to the use disabled status.

Figure 33:
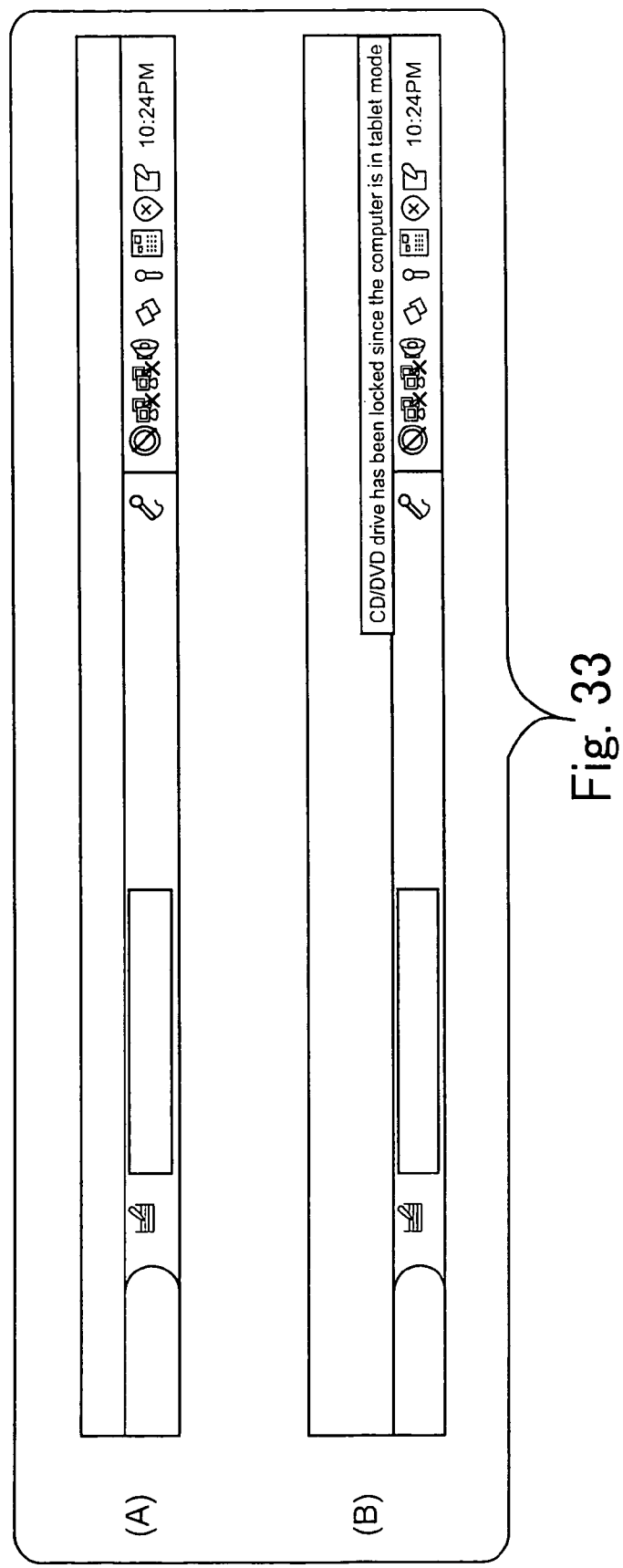
FIGS. 33A and 33B are further screen displays showing that the optical disk drive is disabled.
Figure 34:
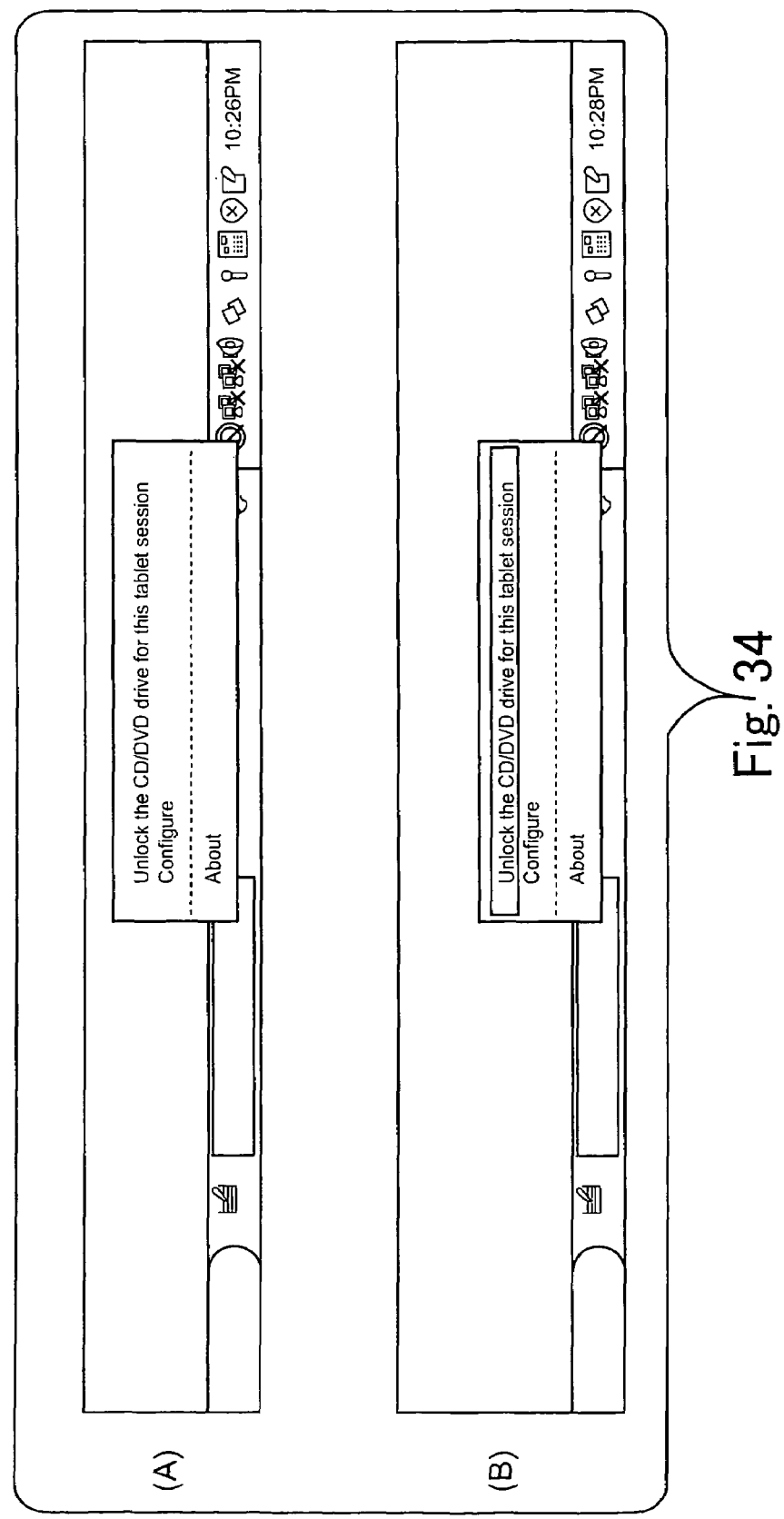
FIGS. 34A and 34B show examples of screen displays for enabling use of the optical disk drive.
Figure 35:
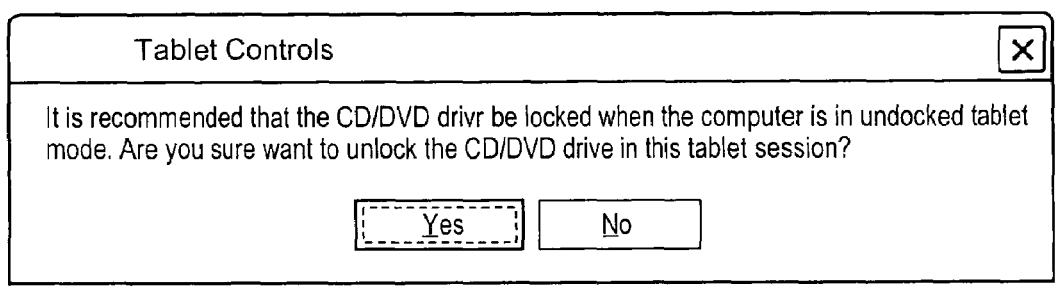
FIG. 35 shows an example of the screen displayed when use of the optical disk drive is enabled in response to the query displayed in FIG. 34B.
Figure 36:
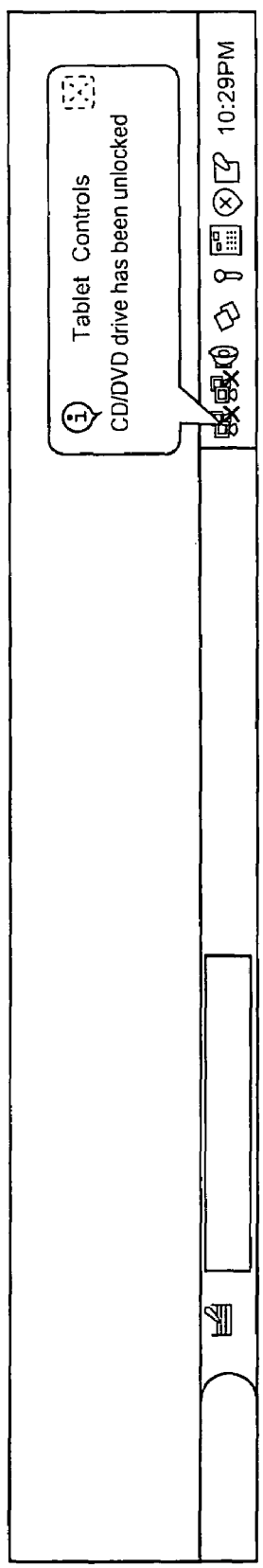
FIG. 36 shows an example of the screen displayed informing that the optical disk drive 26 is enabled.
Figure 37:
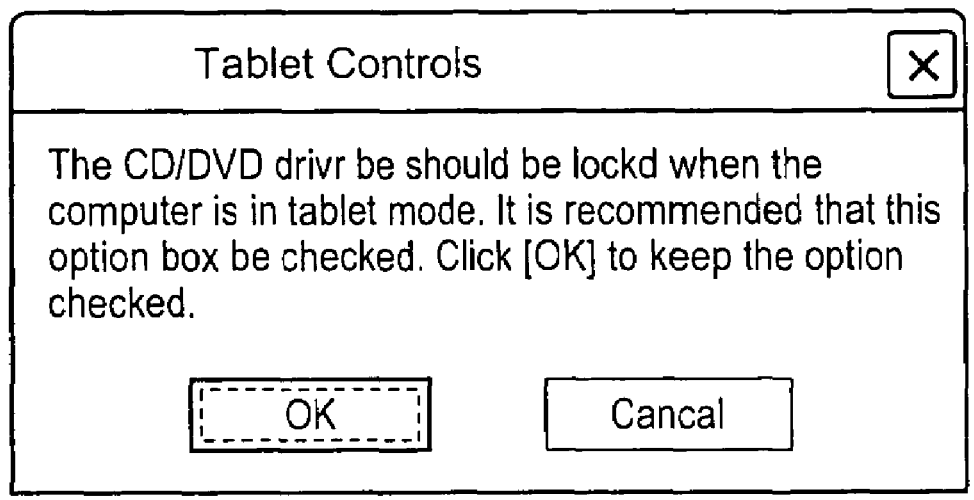
FIG. 37 shows the warning screen when the function of prohibiting the use of optical disk drive is overridden in the tablet mode.

In this embodiment, an icon indicating that the optical disk drive is in the use disabled status is displayed, and the indication of having entered the use disabled status is displayed for a certain period of time. FIG. 33 shows an example of the screen displaying that the optical disk drive is currently in the use disabled status.

Part (A) of FIG. 33 shows an icon indicating that the optical disk drive is currently in the use disabled status. When the icon is pointed to by the cursor on the display screen, the explanation of the icon is displayed for a predetermined time as indicated by part (B) of FIG. 33.

What is claimed is:

1. An electronic apparatus that includes a display panel having a display screen and a cover for covering the display panel, wherein:
    the display panel has a first mounting hole for accepting a display fastener;
    the cover has a first boss on which a first fastener hole is formed and which is formed in a position off center with respect to the first mounting hole, and the cover further has a positioning pin that projects on the same central axis as the first mounting hole; and
    the electronic apparatus includes a fixing member in which are formed a second mounting hole that is fixed by a first fastener to the first fastener hole of the first boss, a positioning hole in which the positioning pin is engaged, and a second fastener hole that is formed on the same central axis as the positioning hole and fixed by the display fastener to the first mounting hole.

2. The electronic apparatus according to claim 1, wherein the cover is capable of accepting a display panel having a third mounting hole that is formed in a position different from the first mounting hole instead of the first mounting hole, and the cover includes a second boss that has a third fastener hole on the same central axis as the third mounting hole.

3. The electronic apparatus according to claim 1, wherein the fixing member has a bent portion having two plates bent to face each other, and the positioning hole is formed in the lower plate of the bent portion and the second fastener hole is formed in the upper plate of the bent portion.

4. The electronic apparatus according to claim 1, wherein the fixing member has a through hole of which lower portion is used as the positioning hole and of which upper portion is used as the second fastener hole.

5. A display panel fixed structure that is used in an electronic apparatus provided with a display panel, the display panel including a display screen and a cover for covering the display panel, wherein:

the cover has a first boss on which a first fastener hole is formed and which is formed in a position off center with respect to a first mounting hole formed in the display panel for accepting a first fastener, and the cover further has a positioning pin that projects on the same central axis as the first mounting hole; and the display panel fixed structure includes a fixing member in which are formed a second mounting hole that is fixed by the first fastener to the first fastener hole of the first boss, a positioning hole in which the pin projection is engaged, and a second fastener hole that is formed on the same central axis as the positioning hole and fixed by a display fastener to the first mounting hole.

6. The display panel fixed structure according to claim 5, wherein the cover is capable of accepting a display panel having a third mounting hole that is formed in a position different from the first mounting hole instead of the first mounting hole, and the cover includes a second boss that has a third fastener hole on the same central axis as the third mounting hole.

7. The display panel fixed structure according to claim 5, wherein the fixing member has a bent portion having two plates bent to face each other, and the positioning hole is formed in the lower plate of the bent portion and the second fastener hole is formed in the upper plate of the bent portion.

8. The display panel fixed structure according to claim 5, wherein the fixing member has a through hole of which lower portion is used as the positioning hole and of which upper portion is used as the second fastener hole.

* * * * *

UNITED STATES PATENT AND TRADEMARK OFFICE
CERTIFICATE OF CORRECTION

PATENT NO. : 7,274,558 B2
APPLICATION NO. : 11/097714
DATED : September 25, 2007
INVENTOR(S) : Katsunori Ito et al.

It is certified that error appears in the above-identified patent and that said Letters Patent is hereby corrected as shown below:

Column 5, Line 42, after "provided" insert -- with an eject button 262 for opening the open/close cover 261 so that the disk can be inserted or --.

Signed and Sealed this

Twenty-third Day of December, 2008

JON W. DUDAS
*Director of the United States Patent and Trademark Office*